United States Patent
Touati et al.

(10) Patent No.: US 11,770,695 B2
(45) Date of Patent: Sep. 26, 2023

(54) MECHANISM TO ACTIVATE AND MANAGE A STANDALONE DEVICE FOR CELLULAR SERVICE

(71) Applicant: Apple Inc., Cupertino, CA (US)

(72) Inventors: Samy Touati, Pleasanton, CA (US); Chenzhi Yu, Sunnyvale, CA (US); Li Li, Los Altos, CA (US); Rafael L. Rivera-Barreto, Santa Clara, CA (US); Rohan C. Malthankar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/962,178

(22) Filed: Oct. 7, 2022

(65) Prior Publication Data

US 2023/0036384 A1   Feb. 2, 2023

Related U.S. Application Data

(63) Continuation of application No. 16/430,542, filed on Jun. 4, 2019, now Pat. No. 11,516,649.
(Continued)

(51) Int. Cl.
*H04W 8/20*   (2009.01)
*H04W 8/26*   (2009.01)
(Continued)

(52) U.S. Cl.
CPC .............. *H04W 8/205* (2013.01); *H04W 8/24* (2013.01); *H04W 8/26* (2013.01); *H04W 88/04* (2013.01)

(58) Field of Classification Search
CPC ......... H04W 8/205; H04W 8/24; H04W 8/26; H04W 88/04; H04W 4/80; H04W 4/00;
(Continued)

(56) References Cited

U.S. PATENT DOCUMENTS 8,316,400 B1   11/2012   Kravets
9,363,314 B2 *   6/2016   Foti .......................... H04W 4/70
(Continued)

FOREIGN PATENT DOCUMENTS

CN   106717042   5/2017
CN   107079239   8/2017
(Continued)

OTHER PUBLICATIONS

First Office Action for Chinese Patent Application No. 201911036112.1; 12 pages; dated Feb. 7, 2022.
(Continued)

*Primary Examiner* — Charles T Shedrick
(74) *Attorney, Agent, or Firm* — Kowert, Hood, Munyon, Rankin & Goetzel, P.C.

(57) ABSTRACT

Some embodiments relate to methods and systems for initiating and transferring cellular subscription service using associated cellular communication devices. Cellular service may be initiated for a first cellular communication device via a second cellular communication device. The first cellular communication device may be provisioned to operate in an independent mode. In other scenarios, cellular service may be transferred from the first cellular communication device operating in independent mode to a third cellular communication device, which may be provisioned to operate in independent mode.

20 Claims, 17 Drawing Sheets

Related U.S. Application Data

(60) Provisional application No. 62/752,312, filed on Oct. 29, 2018.

(51) Int. Cl.
  *H04W 8/24* (2009.01)
  *H04W 88/04* (2009.01)

(58) Field of Classification Search
  CPC ......... H04W 4/50; H04W 8/18; H04W 12/06; H04W 4/60; H04L 61/4588; H04L 2101/65; H04L 2101/654; H04L 67/02
  See application file for complete search history.

(56) References Cited

U.S. PATENT DOCUMENTS

| | | | |
|---|---|---|---|
| 9,609,458 B2 | 3/2017 | Ramanna | |
| 10,652,728 B1* | 5/2020 | Guday | H04W 48/16 |
| 2008/0214161 A1* | 9/2008 | Jakl | H04M 1/72457 |
| | | | 455/414.2 |
| 2011/0028126 A1* | 2/2011 | Lim | H04W 12/06 |
| | | | 455/411 |
| 2012/0047227 A1* | 2/2012 | Haggerty | H04W 8/183 |
| | | | 709/217 |
| 2012/0084467 A1* | 4/2012 | Birnbaum | G06F 3/04847 |
| | | | 710/16 |
| 2013/0045761 A1* | 2/2013 | Grant | H04M 1/72436 |
| | | | 455/466 |
| 2014/0128063 A1* | 5/2014 | Chhabra | H04W 8/005 |
| | | | 455/435.1 |
| 2014/0156082 A1* | 6/2014 | Ha | H04L 12/2818 |
| | | | 700/275 |
| 2015/0145656 A1* | 5/2015 | Levesque | G06Q 20/3224 |
| | | | 340/407.1 |
| 2015/0237496 A1* | 8/2015 | Gao | H04B 1/3816 |
| | | | 455/414.1 |
| 2015/0324049 A1* | 11/2015 | Kies | G06F 3/016 |
| | | | 345/156 |
| 2016/0036476 A1* | 2/2016 | Cho | H04B 1/3816 |
| | | | 455/558 |
| 2016/0050557 A1* | 2/2016 | Park | H04W 8/205 |
| | | | 455/419 |
| 2016/0088465 A1* | 3/2016 | Golla | H04W 8/205 |
| | | | 455/450 |
| 2016/0134737 A1* | 5/2016 | Pulletikurty | G04G 21/00 |
| | | | 715/735 |
| 2016/0150400 A1 | 5/2016 | Cha | |
| 2016/0286466 A1* | 9/2016 | Huang | H04W 76/27 |
| 2016/0330608 A1* | 11/2016 | Benn | H04W 8/183 |
| 2016/0374134 A1* | 12/2016 | Kweon | H04W 12/06 |
| 2017/0038847 A1* | 2/2017 | Schorsch | G06F 1/163 |
| 2017/0048645 A1* | 2/2017 | Yerrabommanahalli | |
| | | | H04L 61/106 |
| 2017/0064572 A1* | 3/2017 | Subramanian | H04W 40/02 |
| 2017/0180349 A1 | 6/2017 | Park | |
| 2017/0289790 A1* | 10/2017 | Singh | H04W 8/205 |
| 2018/0077566 A1 | 3/2018 | Cha | |
| 2018/0098178 A1 | 4/2018 | Yerrabommahalli | |
| 2018/0288560 A1* | 10/2018 | Naik | H04W 4/50 |
| 2019/0141518 A1* | 5/2019 | Lin | H04W 8/205 |
| 2019/0357038 A1* | 11/2019 | Schouler | H04W 12/40 |
| 2020/0059778 A1* | 2/2020 | Li | H04W 8/205 |
| 2020/0137557 A1* | 4/2020 | Touati | H04W 4/50 |
| 2020/0137566 A1* | 4/2020 | Jin | H04W 12/50 |
| 2021/0006964 A1 | 1/2021 | Lee | |
| 2021/0076204 A1* | 3/2021 | Goyal | H04L 67/306 |

FOREIGN PATENT DOCUMENTS

| | | | | |
|---|---|---|---|---|
| CN | 107211268 | | 9/2017 | |
| CN | 107925868 | | 4/2018 | |
| CN | 108141745 | | 6/2018 | |
| CN | 108141747 | | 6/2018 | |
| CN | 108093394 B | | 11/2020 | |
| EP | 2410777 A1 * | | 1/2012 | ......... G06F 12/0246 |
| NL | 7909265 A | | 6/1980 | |
| WO | 2018019883 | | 1/2018 | |
| WO | 2018146408 | | 8/2018 | |

OTHER PUBLICATIONS

Notice of Allowance for CN Patent Application No. 201911036112.1; 5 pages; dated Jul. 6, 2022.

Research on network access scheme of consumer IOT terminal based on eSIM, <IT Technology>, Jianshu Qiu, et., al., Oct. 15, 2017.

* cited by examiner

MECHANISM TO ACTIVATE AND MANAGE A STANDALONE DEVICE FOR CELLULAR SERVICE

PRIORITY CLAIM

This application is a continuation of U.S. application Ser. No. 16/430,542, titled "Mechanism to Activate and Manage a Standalone Device for Cellular Service", filed Jun. 4, 2019, which claims benefit of priority of U.S. provisional application Ser. No. 62/752,312, titled "Mechanism to Activate and Manage a Standalone Device for Cellular Service", filed Oct. 29, 2018, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless communication, including initiating and transferring cellular subscription service using associated cellular communication devices.

DESCRIPTION OF THE RELATED ART

Wireless communication systems are rapidly growing in usage. Further, wireless communication technology has evolved from voice-only communications to also include the transmission of data, such as Internet and multimedia content.

Wireless communication devices may take the form of smart phones or tablets that a user typically carries. Wearable devices are a newer form of wireless communication device, one example being smart watches. Other devices, such as smart speakers, security systems, and home entertainment devices, among others, are also increasingly relying upon wireless communications. Certain types of wireless communication devices may traditionally have limited wireless communications capabilities and may be capable of communicating only over wired interfaces or short-range point-to-point technologies. Therefore, such devices may sometimes be associated with a primary wireless communication device, such as a smart phone, and may depend upon the primary device in order to perform long-range wireless communications.

It would be desirable for such wireless communication devices to provide communications capabilities similar to those of smart phones. Thus, improvements in the field are desirable.

SUMMARY

Embodiments are presented herein of, inter alia, systems and associated methods for initiating and transferring cellular subscription service using associated cellular communication devices.

A method is disclosed for managing a cellular service subscription of a first cellular communication device via a second cellular communication device. The second cellular communication device may receive an address of a web portal for managing the cellular service subscription of the first cellular communication device while the first cellular communication device is in an independent mode. The second cellular communication device may then provide to the web portal an instruction to modify the cellular service subscription of the first cellular communication device. The second cellular communication device may also notify the first cellular communication device of the modifications to the cellular service subscription.

In some scenarios, the second cellular communication device may receive the address of the web portal from a cellular communication network. In some scenarios, the second cellular communication device may receive the address of the web portal from the first cellular communication device.

In some scenarios, the second cellular communication device may determine whether the first cellular communication device is associated with a subscription account of the second cellular communication device. In response to determining that the first cellular communication device is not associated with the subscription account of the second cellular communication device, second cellular communication device may provide to the first cellular communication device a request for the address of the web portal.

In some scenarios, the second cellular communication device may receive identification information of the first cellular communication device.

In some scenarios, the second cellular communication device may determine that the second cellular communication device is authorized by the cellular communication network to perform subscription management functions for a device in independent mode.

In some scenarios, the instruction to modify the cellular service subscription of the first cellular communication device may include an instruction to switch the first cellular communication device from the independent mode to a dependent mode.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
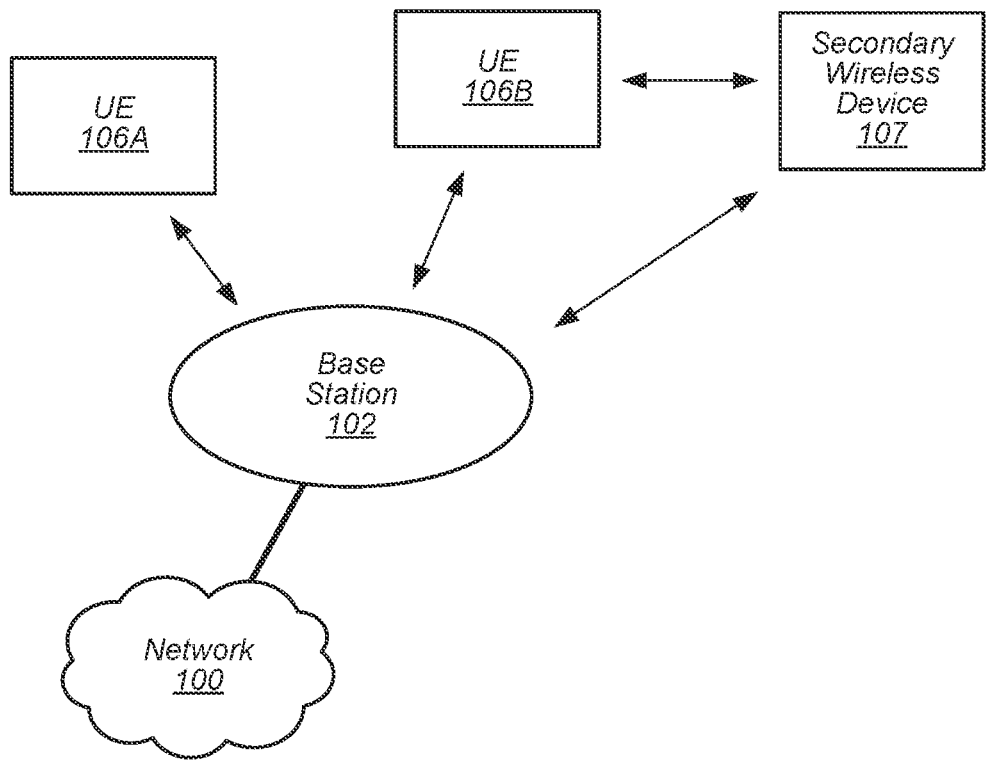
FIG. 1 illustrates an example wireless communication system including a secondary wireless device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in this disclosure.
3GPP: Third Generation Partnership Project
3GPP2: Third Generation Partnership Project 2
NR: New Radio
CSN: Card Serial Number
eICCID: Embedded Integrated Circuit Card Identifier
EID: Electronic Identifier
eSIM: Embedded SIM
GSM: Global System for Mobile Communications
ICCID: Integrated Circuit Card Identifier
IMEI: International Mobile Equipment Identity
IMSI: International Mobile Subscriber Identity
LTE: Long Term Evolution
LTE-A: LTE-Advanced
MSISDN: Mobile Station International Subscriber Directory Number
SIM: Subscriber Identity Module
UMTS: Universal Mobile Telecommunications System Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as secondary wireless device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as a secondary wireless device 107. The secondary wireless device 107 may be any of various types of devices capable of being provisioned with an embedded SIM (eSIM), such as a wearable device, a tablet computing device, a laptop computer, a handheld device, a smart speaker, a home entertainment device, a security system, etc. The secondary wireless device 107 may, in some cases, have a smaller form factor and/or may have limited battery, output power and/or communications abilities relative to UEs 106. As one common example, the UE 106B may be a smart phone carried by a user, and the secondary wireless device 107 may be a smart watch worn by that same user or a different user. The UE 106B and the secondary wireless device 107 may communicate, e.g., using any of various short-range communication protocols, such as Bluetooth, and/or over a WLAN, such as Wi-Fi.

In some embodiments the UE 106B and/or the secondary wireless device 107 may be configured to perform dynamic eSIM provisioning and/or cellular service subscription management, as described herein.

Figure 2:
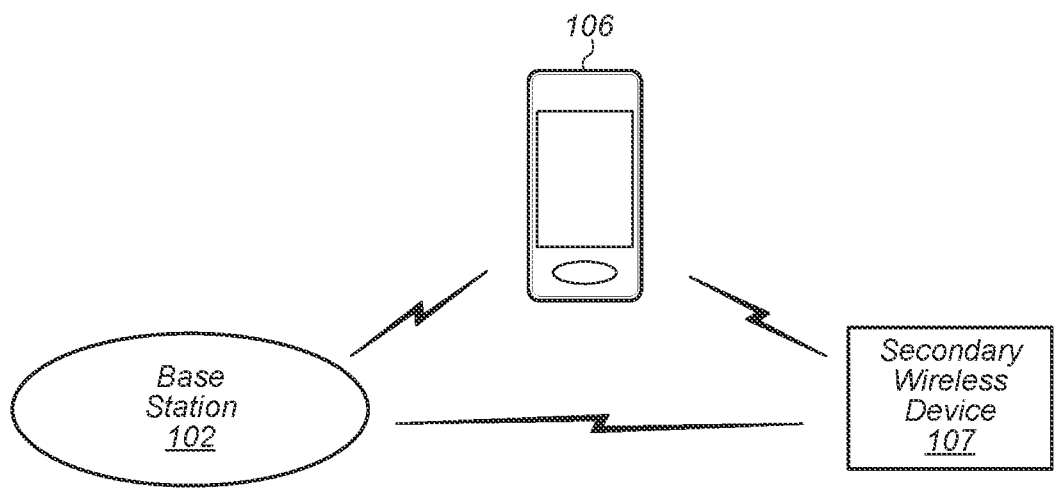
FIG. 2 illustrates an example system where a secondary wireless device can selectively either directly communicate with a cellular base station or utilize the cellular capabilities of an intermediate or proxy device such as a smart phone, according to some embodiments.

FIG. 2 illustrates an example secondary wireless device 107 in communication with base station 102. The secondary wireless device 107 may be a wearable device such as a smart watch. The secondary wireless device 107 may include cellular communication capability and be capable of directly communicating with the base station 102 as shown. The secondary wireless device 107 may also be capable of communicating with another device (e.g., UE 106), e.g., using a short-range communications protocol, such as Wi-Fi or Bluetooth.

The secondary wireless device 107 may include a processor that is configured to execute program instructions stored in memory. The secondary wireless device 107 may perform any of the method embodiments described herein by executing such stored instructions. Alternatively, or in addition, the secondary wireless device 107 may include a programmable hardware element such as an FPGA (field-programmable gate array), or other circuitry, that is configured to perform any of the method embodiments described herein, or any portion of any of the method embodiments described herein. For example, the secondary wireless device 107 may be configured to perform dynamic eSIM provisioning and/or cellular service subscription management, as described herein.

The secondary wireless device 107 may include one or more antennas for communicating using two or more wireless communication protocols or radio access technologies. In some embodiments, the secondary wireless device 107 might be configured to communicate using a single shared radio. The shared radio may couple to a single antenna, or may couple to multiple antennas (e.g., for MIMO) for performing wireless communications. Alternatively, the secondary wireless device 107 may include two or more radios. For example, the secondary wireless device 107 might include a shared radio for communicating using either of LTE (or LTE-Advanced, NR, etc.) or Bluetooth, and separate radios for communicating using each of LTE-Advanced and Bluetooth. Other configurations are also possible.

Figure 3:
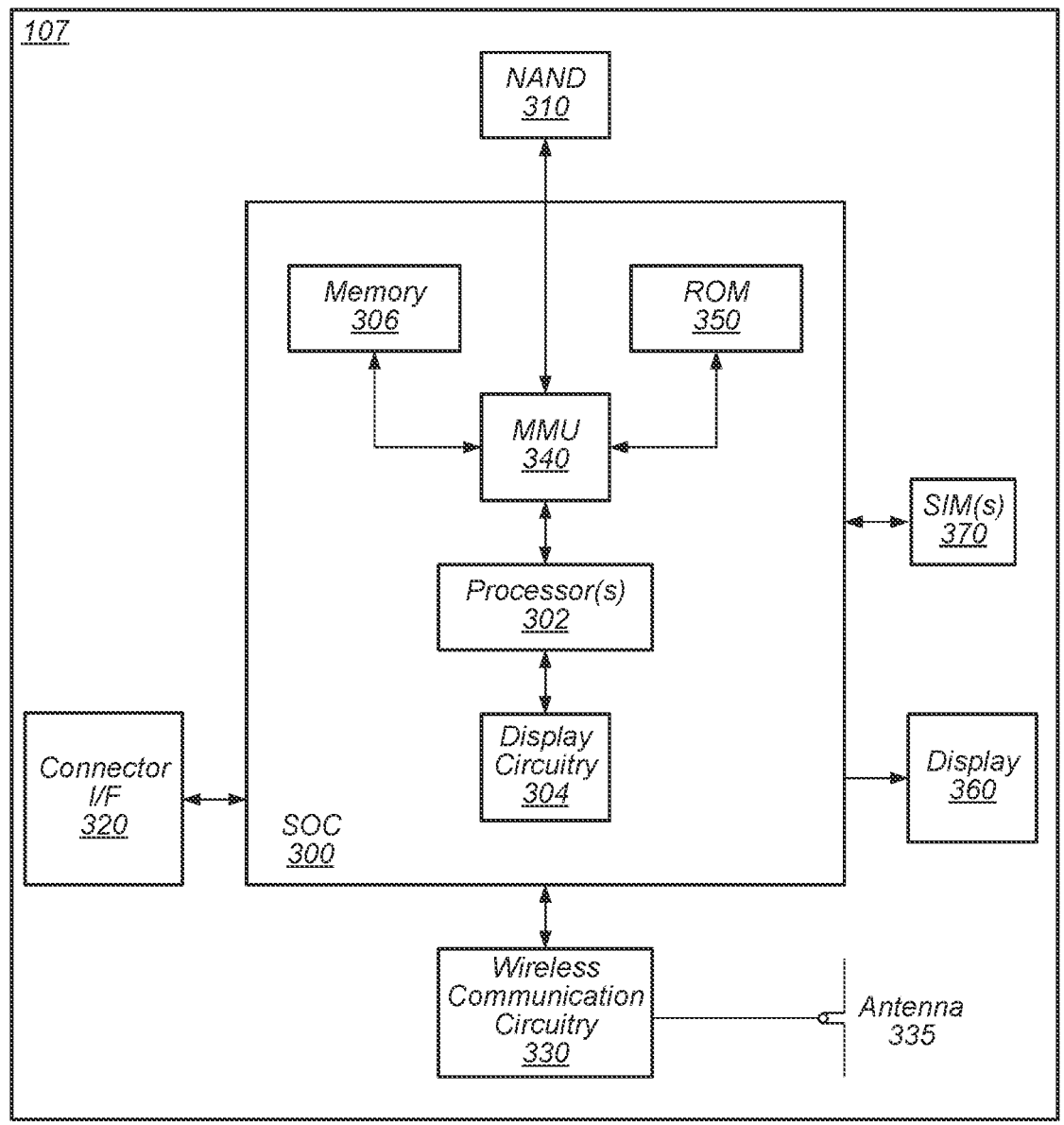
FIG. 3 is a block diagram illustrating an example secondary wireless device, according to some embodiments.

FIG. 3—Example Block Diagram of a Secondary Wireless Device

FIG. 3 illustrates one possible block diagram of a secondary wireless device 107. As shown, the secondary wireless device 107 may include a system on chip (SOC) 300, which may include portions for various purposes. For example, as shown, the SOC 300 may include processor(s) 302 which may execute program instructions for the secondary wireless device 107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The secondary wireless device 107 may also include other circuits or devices, such as the display circuitry 304, wireless communication circuitry (radio) 330, connector interface (I/F) 320, and/or display 360. The wireless device 107 may further include one or more smart cards 370 that include SIM (Subscriber Identity Module) functionality, such as one or more UICC(s) (Universal Integrated Circuit Card(s)).

In the embodiment shown, ROM 350 may include a bootloader, which may be executed by the processor(s) 302 during boot up or initialization. As also shown, the SOC 300 may be coupled to various other circuits of the secondary wireless device 107. For example, the secondary wireless device 107 may include various types of memory, a connector interface 320 (e.g., for coupling to a computer system), the display 360, and wireless communication circuitry (e.g., for communication using LTE, NR, CDMA2000, Bluetooth, Wi-Fi, NFC, GPS, etc.).

The secondary wireless device 107 may include at least one antenna, and in some embodiments multiple antennas, for performing wireless communication with base stations and/or other devices. For example, the secondary wireless device 107 may use antenna 335 to perform the wireless communication. As noted above, the UE may in some embodiments be configured to communicate wirelessly using a plurality of wireless communication standards or radio access technologies (RATs).

As noted above, the secondary wireless device 107 may include at least one smart card 370, such as a UICC, which executes one or more Subscriber Identity Module (SIM) applications and/or otherwise implements SIM functionality. The at least one smart card 370 may be only a single smart card 370, or the secondary wireless device 107 may include two or more smart cards 370.

Each smart card 370 may be embedded, e.g., may be soldered onto a circuit board in the secondary wireless device 107, or each smart card 370 may be implemented as a removable smart card. Thus, the smart card(s) 370 may be one or more removable smart cards (such as UICCs, which are sometimes referred to as "SIM cards"), and/or the smart card(s) 370 may be one or more embedded cards (such as embedded UICCs (eUICCs), which are sometimes referred to as "eSIM cards"), which may be fixed/non-removable. In some embodiments, the secondary wireless device 107 may include a combination of removable smart cards and embedded smart cards, as desired. For example, the UE 106 may include two embedded smart cards 370, two removable smart cards 370, or a combination of one embedded smart card 370 and one removable smart card 370. Various other SIM configurations are also contemplated.

In some embodiments, one or more of the smart card(s) 370 may implement embedded SIM (eSIM) functionality. In such embodiments, a single one of the smart card(s) 370 may execute multiple SIMs. An eSIM may be implemented on either an eUICC or a removable UICC, as long as the card's operating system supports eSIM functionality.

Each of the smart card(s) 370 may include components such as a processor and a memory. Instructions for performing SIM/eSIM functionality may be stored in the memory and executed by the processor.

As described herein, the secondary wireless device 107 may include hardware and software components for implementing methods according to embodiments of this disclosure. For example, the secondary wireless device 107 may be configured to perform dynamic eSIM provisioning and/or cellular service subscription management, as described herein. The processor 302 of the secondary wireless device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

It is noted that the UEs 106A and 106B shown in FIG. 1 may have a same or similar architecture to that described above with regard to the secondary wireless device 107.

FIGS. 4-8—Initiating Cellular Service

When a cellular communication device, such as the secondary wireless device 107, is obtained by a user, or at other times, cellular service may be initiated for the cellular communication device. In some scenarios, a user may wish to initiate the cellular service in connection with an existing service subscription account. For example, a cellular service provider (also referred to herein as a "carrier") may maintain a service subscription account that includes, provides, or is otherwise associated with, cellular service for one or more cellular communication devices. For example, the cellular service provider may maintain a service subscription account for a user, or a group of users (e.g., a family plan), that provides cellular service for one or more smart phones, one or more tablet devices, and/or one or more additional devices.

In some such scenarios, the process of initiating cellular service for the cellular communication device may be facilitated by use of an assistant device, such as the UE 106. For example, in some scenarios, the device to be targeted for initiated cellular service (the "target device") may have limited user-interface capabilities (e.g., a smart speaker), in which case use of the assistant device may provide a user interface to perform the cellular service initiation. Alternatively, or additionally, the cellular service initiation process may be facilitated by virtue of the assistant device authenticating with the cellular service provider that the target device may be added to the existing service subscription account associated with the assistant device.

Figure 4:
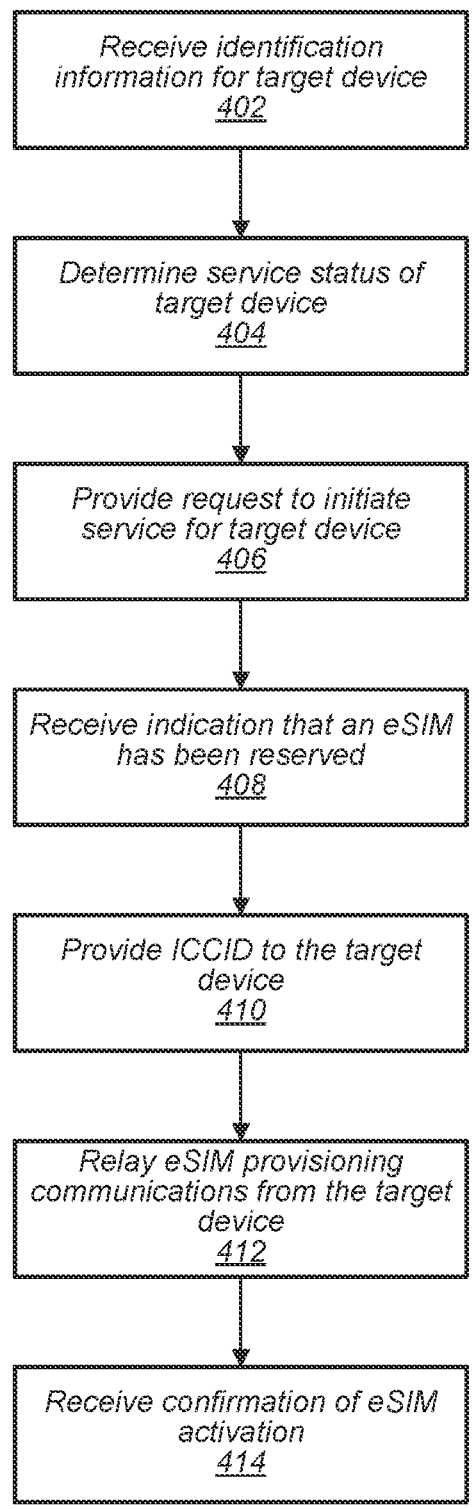
FIG. 4 is a flow diagram illustrating an example method for initiating cellular service for a target device via an assistant device, according to some embodiments.

FIG. 4 illustrates an example method for initiating cellular service for a target device, such as the secondary wireless device 107, via an assistant device, such as the UE 106, according to some embodiments. The target device may be any type of cellular communication device that is capable of being provisioned with an eSIM.

At 402, the assistant device may receive identification information for the target device. For example, the identification information may include an electronic identifier (EID), International Mobile Equipment Identity (IMEI), Card Serial Number (CSN), device name, device type, and/or other identifying information. In some scenarios, the identification information may additionally, or alternatively, include a notification push token of the target device, which may identify the target device within a push-notification service network. In some scenarios, the assistant device may receive the identification information from the target device, e.g., via a short-range wireless communication protocol, such as Bluetooth or Wi-Fi. In other scenarios, the assistant device may receive the identification information, or some portion thereof, from the user, or from another source. In some scenarios, 402 may be omitted, e.g., if the assistant device is already aware of identifying information of the target device.

In some scenarios, the assistant device may further receive identification information for a third cellular communication device. For example, the user may desire to retire a previously provisioned cellular communication device and replace the retired device with the target device. As a specific example, the user may replace an old smart watch with a newer model, and may want the new watch to maintain the subscription information of the old watch. In such scenarios, the assistant device may receive identification information for the third cellular communication (e.g., retired) device, such as an EID, IMEI, CSN, device name, device type, and/or other identifying information. In particular, the assistant device may receive an ICCID of an eSIM previously provisioned to the third cellular communication (e.g., retired) device.

At 404, the assistant device may determine a current service status of the target device. For example, in some scenarios, the assistant device may determine a current service status based on the received identification information. In some scenarios, the assistant device may determine a current service status by querying a cellular communication network, which may include querying a server or service therein. For example, the assistant device may query the cellular communication network regarding whether the target device currently has an active cellular service subscription. More specifically, the assistant device may query the cellular communication network to determine whether the target device currently has an active cellular service subscription associated with a cellular service subscription that is associated with the assistant device. The assistant device may receive from the cellular communication network a response to the query, e.g., indicating whether the target device currently has an active cellular service subscription and/or is associated with a service subscription that is associated with the assistant device. As a specific example, the assistant device may receive from the cellular communication network a list of devices associated with the same service subscription that is associated with the target device and/or with the assistant device. In some scenarios the assistant device may also determine the status of a third cellular communication (e.g., retired) device, e.g., to determine whether the third cellular communication device currently has an active cellular service subscription associated with a cellular service subscription that is associated with the assistant device. In some scenarios, 404 may be omitted.

At 406, the assistant device may provide, to the cellular communication network, a request to initiate service for the target device. In some scenarios, the request may be responsive to determining, at 404, that no cellular service subscription for the target device is currently associated with a service subscription account associated with the assistant device. The request may include an identifier of the target device, such as any of the identification information received at 402. In some scenarios, the request may include an authentication token or other indication that the assistant device is trusted by the cellular communication network and/or the cellular service provider. Such an authentication token or other indication of trust may have been previously received by the assistant device from the cellular communication network, e.g., by performing an authentication procedure with the cellular communication network.

The request may include an indication of the type of service subscription to be provided. For example, in some scenarios, the request may include an indication that the service subscription should support dependent operation. Specifically, the request may indicate that the target device should be provisioned as a dependent secondary device to the assistant device. In such scenarios, the dependent target device may be provisioned with a limited service subscription. For example, the target device may be provisioned with an eSIM that is configured for multi-SIM functionality, such that the target device and the assistant device share a single Mobile Station International Subscriber Directory Number (MSISDN); e.g., the single MSISDN may be mapped to the IMSIs (or other identifiers) of both the target device and the assistant device. Further, push notifications or other communications intended for the dependent target device may be routed (e.g., exclusively) through the assistant device. Additionally, or alternatively, the network may accept further subscription management actions pertaining to the dependent target device only from the assistant device.

As another example, the request may, in some scenarios, include an indication that the service subscription should support independent operation. Specifically, the request may indicate that the target device should be provisioned as an independent standalone device. In such scenarios, the independent target device may be provisioned with a more complete service subscription. For example, the target device may be provisioned with an eSIM that is assigned a unique MSISDN. Further, push notifications or other communications may be routed directly to the independent target device. This may present significant advantages, as the independent addressing of push notifications may allow the network to accept further subscription management actions pertaining to the independent target device from a plurality of devices (e.g., any cellular communication device associated with the same service subscription account), rather than limiting subscription management to only a single device that receives push notifications for the target device. In such scenarios, the request may further include additional instructions or information, such as the notification push token of the target device, and/or an instruction to enable push notifications to/from the independent target device.

In some scenarios, the request may include an ICCID of a specific eSIM to be provisioned to the target device. For example, the request may include the ICCID of an eSIM previously provisioned to a third cellular communication (e.g., retired) device. In such scenarios, the request may be interpreted as an instruction to transfer the subscription of the third cellular communication device to the target device.

At 408, the assistant device may receive, from the cellular communication network, an indication that an eSIM has been reserved for the target device. The indication may include an identifier of the target device, such as the identifier provided at 406. The indication may further include an ICCID of the reserved eSIM. In some scenarios, the indication may also include additional information, such as an initial state of the eSIM, a user token associated with the eSIM, etc.

At 410, the assistant device may provide to the target device the ICCID received at 408. The assistant device may further provide any/all other information received at 408. In some scenarios, the assistant device may explicitly provide an instruction for the target device to download and install the reserved eSIM. In other scenarios, the instruction may be implicit in providing the ICCID.

At 412, the assistant device may relay eSIM provisioning communications from the target device. For example, in some scenarios, the target device may be unable to establish a communication connection with an eSIM server of the cellular communications network, but may be able to establish a connection (e.g., Bluetooth or Wi-Fi) with the assistant device. The assistant device may receive from the target device, e.g., a message requesting provision of the reserved eSIM (e.g., requesting that the reserved eSIM be downloaded to the target device), and may relay that message to the eSIM server. The assistant device may receive, e.g., the reserved eSIM from the eSIM server, and may relay the eSIM to the target device. In some scenarios, 412 may be omitted, e.g., if the target device can establish an independent connection (e.g., via Wi-Fi) with the eSIM server.

At 414, the assistant device may receive from the cellular communication network an indication that the eSIM reserved for the target device has been activated. In some scenarios, this indication may be responsive to a query made by the target device to the cellular communication network, wherein the cellular communication network provides a response to both the target device and the assistant device. In some scenarios, 414 may be omitted.

Any reference to "the cellular communication network" in connection with the preceding description of FIG. 4 should be understood as including any of various network components, servers, and/or services, including various components provided by, maintained by, or interfacing with the cellular service provider. As a non-exhaustive, non-limiting list of examples, communicating with the cellular communication network may include at least communicating with an access server, an authorization server, a push notification server, a carrier web portal, an eSIM server, and/or various other portals or servers.

Figure 5:
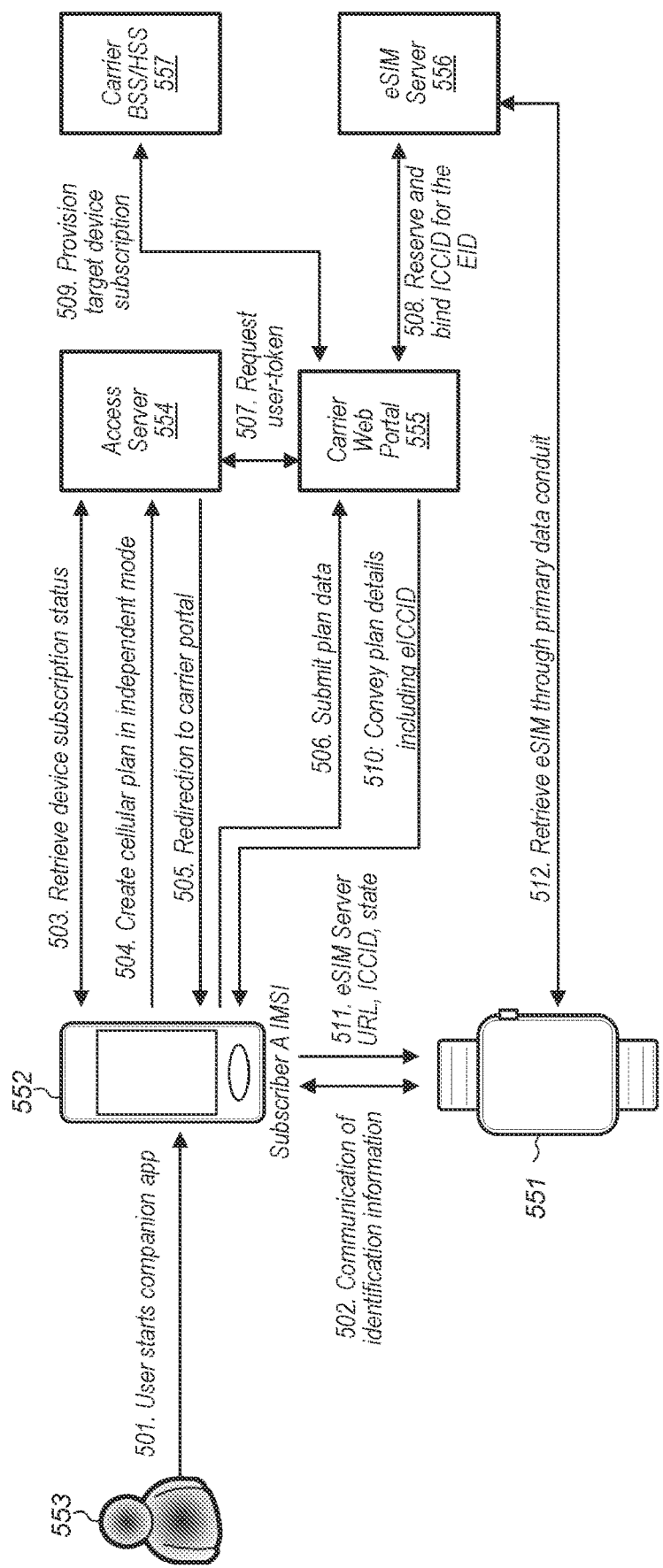
FIG. 5 illustrates an example system and method for initiating cellular service for a target device, consistent with the method illustrated in FIG. 4, but including additional optional details, according to some embodiments.

FIG. 5 illustrates an example system and method for initiating cellular service for a target device, consistent with the method illustrated in FIG. 4, but including additional optional details, according to some embodiments. It should be understood that various modifications may be made to the system and/or method illustrated in FIG. 5, to provide alternative implementations of the method illustrated in FIG. 4. It should therefore be further understood that any of the optional details illustrated in FIG. 5 may be included in an implementation of FIG. 4 without requiring inclusion of all details illustrated in FIG. 5.

As illustrated in FIG. 5, cellular service may be initiated for target device 551, by utilizing assistant device 552. Although the target device 551 is illustrated as a smart watch, and the assistant device 552 is illustrated as a smart phone, these are merely example illustrations, and are not intended to be limiting. As noted with regard to FIG. 4, the target device (551) may be any type of cellular communication device capable of being provisioned with an eSIM, such as the secondary wireless device 107, and the assistant device (552) may be any type of cellular communication device, such as the UE 106.

At 501, user 553 may begin the process of initiating cellular service for the target device 551, e.g., by launching or activating a command or a software application (e.g., a companion app) on the assistant device 552. The software application may provide a graphical user interface (GUI) for managing the initiation process, and may enable temporary pairing of the target device 551 with the assistant device 552, e.g., for the duration of the cellular service initiation process. In some scenarios, the process of initiating cellular service may begin in some other manner, such as by a communication from the target device 551 to the assistant device 552.

At 502, the target device 551 and the assistant device 552 may communicate one or more messages including the target device 551 providing identifying information to the assistant device 552, e.g., consistent with 402 of FIG. 4.

The assistant device 552 may be in communication with an access server 554. The access server 554 may include one or more server and/or service configured to act as a portal to various information maintained by the cellular service provider. For example, the access server 554 may verify, confirm, retrieve, and/or update information regarding associations between various cellular communication devices. For example, the access server 554 may have access to service subscription account information, including information identifying cellular communications devices associated with a given service subscription account. The access server 554 may be hosted by the cellular service provider or by an agent thereof, or by the third-party entity. In some scenarios, the access server 554 may act as a portal to multiple cellular service providers.

At 503, the assistant device 552 may communicate one or more messages with the access server 554, e.g., to retrieve subscription status of the target device. For example, the assistant device 552 may perform an authentication procedure, e.g., to verify that the assistant device 552 is trusted by the cellular service provider, and/or perform a status inquiry, e.g., to verify that the assistant device 552 is associated with a service subscription account provided by the cellular service provider. More generally, the assistant device 552 may communicate with the access server 554 to determine the service status of the target device 551, e.g., consistent with 404 of FIG. 4.

At 504, the assistant device may provide, to the access server 554, a request to initiate service for the target device 551, e.g., consistent with 406 of FIG. 4. As illustrated in the example of FIG. 5, the request includes an indication that the service subscription should support independent operation. In some scenarios, the request may include an instruction to enable push notifications to/from the target device 551.

The assistant device 552 may be in communication with a carrier web portal 555. The carrier web portal 555 may include one or more server and/or service configured to act as a portal to various information maintained by the cellular service provider. For example, the carrier web portal 555 may be configured to provide a security interface between the assistant device 552 and an eSIM server 556. Specifically, in some scenarios, the eSIM server 556 may be configured to communicate (or to accept certain types of instructions) only with a trusted network entity, such as the carrier web portal 555 and/or the access server 554. In some scenarios, the carrier web portal 555 may include a websheet server that provides a graphical interface to various information maintained by the cellular service provider. The carrier web portal 555 may be hosted by the cellular service provider or agent thereof, or by the third-party entity.

At 505, the access server 554 may provide, to the assistant device 552, an instruction redirecting the service initiation request to the carrier web portal 555. The instruction may include an address (e.g., a URL) of the carrier web portal 555, as well as any additional information and/or authentication required to redirect the service initiation request to the carrier web portal 555. The instruction may also include confirmation that push notifications to the target device 551 have been enabled. Such push notifications may be useful, e.g., for notifying the target device 551 of a change in subscription state of the eSIM to be provisioned, such as when the eSIM is activated following provisioning.

At 506, the assistant device 552 may provide to the carrier web portal 555 a redirected request to initiate service for the target device 551. The redirected request may include data regarding a service plan to be activated for the target device 551. In some scenarios, the redirected request may include a token or other indication that the redirected request was redirected from the access server 554. In some scenarios, the redirected request may include a trust flag or other indication that the assistant device 552 previously established a trusted relationship with the access server 554. In some scenarios, the carrier web portal 555 may treat the assistant device 552 as a trusted entity based on that trust flag or other indication. In some scenarios, the trust flag or other indication may be based on an established protocol or standard, such as the OAuth standard (e.g., as defined by IETF RFC 6749 and RFC 6750). In other scenarios, the carrier web portal 555 may challenge the assistant device 552 for security credentials (e.g., user name and password).

At 507, the carrier web portal 555 may exchange information with the access server 554 in response to the redirected request. For example, the carrier web portal 555 may request allocation of a carrier user token for the target device 551. The access server 554 may allocate a carrier user token for the target device 551 and provide the carrier user token to the carrier web portal 555.

The carrier web portal 555 may be in communication with the eSIM server 556. The eSIM server 556 may include one or more server and/or service configured to manage and provision eSIMs. The eSIM server 556 may be hosted by the cellular service provider or by an agent thereof.

At 508, the carrier web portal 555 may exchange information with the eSIM server 556. For example, the carrier web portal 555 may, at least partly in response to the redirected request, provide to the eSIM server 556 a request that an eSIM be provisioned for the target device 551. The request may include an EID or other identifier of the target device 551. In some scenarios, the request may further include information regarding a configuration of the eSIM to be provisioned. For example, in the example scenario of FIG. 5, the request may indicate that the eSIM to be provisioned should support independent operation of the target device 551, e.g., should not share an MSISDN with the assistant device 552. The eSIM server 556 may, in response to the request, reserve an eSIM for the target device 551, bind the reserved eSIM to an identifier of the target device 551 (e.g., an EID or other identifier), and provide an ICCID of the reserved eSIM to the carrier web portal 555.

The carrier web portal 555 may be in communication with a carrier BSS/HSS system 557. The carrier BSS/HSS system 557 may include one or more server and/or service configured to provide functionality as a business support system (BSS) and as a home subscriber server (HSS) for the carrier (e.g., the cellular service provider). For example, the carrier BSS/HSS system 557 may provide service subscription account information and services, such as billing information and services. The carrier BSS/HSS system 557 may be further configured to provide additional telephony application services, e.g., in the capacity of an HSS. The carrier BSS/HSS system 557 may be hosted by the cellular service provider or by an agent thereof.

At 509, the carrier web portal 555 may exchange information with the carrier BSS/HSS system 557. For example, the carrier web portal 555 may provide to the carrier BSS/HSS system 557 a request to activate a cellular service subscription for the target device 551. The request may include an identifier of the target device 551. In some scenarios, the request may include an identifier of the assistant device 552 and/or may identify a service subscription account associated with the assistant device 552, and may indicate that the cellular service subscription for the target device 551 should be associated with (e.g., included in) the service subscription account associated with the assistant device 552. In some scenarios, the request may include an indication of the type of service subscription to be provided (e.g., independent or dependent). In response to the request, the carrier BSS/HSS system 557 may activate the cellular service subscription for the target device 551, e.g., associated with the service subscription account associated with the assistant device 552. The carrier BSS/HSS system 557 may provide to the carrier web portal 555 a confirmation that the cellular service subscription has been activated.

At 510, the carrier web portal 555 may provide, to the assistant device 552, an indication that the eSIM has been reserved, consistent with 408 of FIG. 4. For example, the indication may include a javascript callback message, though other message formats are also envisioned. The indication may include the ICCID of the reserved eSIM. In some scenarios, the indication may include an address (e.g., URL) for communicating with the eSIM server 556. In some scenarios, the indication may include initial state information for the reserved eSIM. In some scenarios, the indication may include the user token provided to the carrier web portal 555 at 507.

At 511, the assistant device 552 may provide, to the target device 551, the ICCID, consistent with 410 of FIG. 4. As illustrated in FIG. 5, the assistant device 552 may also provide the address for communicating with the eSIM server 556 and/or the initial state information of the reserved eSIM.

At 512, the target device 551 may communicate with the eSIM server 556, e.g., using the address provided at 510-511. As illustrated in FIG. 5, the target device 551 may communicate directly with the eSIM server 556 via a primary data conduit, e.g., a non-cellular communication conduit, such as a Wi-Fi network. It should be understood that in other scenarios, the target device 551 may communicate with the eSIM server 556 via the assistant device 552, consistent with 412 of FIG. 4. Specifically, at 512, the target device 551 may provide to the eSIM server 556 a download request for the reserved eSIM. In response, the eSIM server 556 may provide the reserved eSIM to the target device 551. The target device 551 may then install the eSIM, e.g., initialized according to the initial state information provided at 510-511.

Once the eSIM has been received and installed by the target device 551, the target device 551 may await notification, e.g., from the access server 554, that the provisioned eSIM is in an active state. In some scenarios, the target device 551 may enter a monitor mode, in which it monitors one or more cellular communication channel(s) for a notification that the provisioned eSIM is in an active state. In other scenarios, the target device may receive the notification via a non-cellular communication conduit, such as via a push notification delivered on the primary data conduit (e.g., Wi-Fi) or via the assistant device 552 (e.g., if the primary conduit is unavailable). In some scenarios, the access server 554 may provide the notification that the provisioned eSIM is in an active state automatically in response to transition of the provisioned eSIM to the active state. In other scenarios, the access server 554 may provide the notification in response to an inquiry from the target device 551 or the assistant device 552. The access server 554 may provide the notification to the target device 551 and/or to the assistant device 552.

Once the eSIM provisioned to the target device 551 is active, the target device 551 may attach to the cellular communication network via the cellular radio access technology (RAT) associated with the eSIM.

Communications between the assistant device 552 and various network entities, such as the access server 554 or the carrier web portal 555 may be performed via cellular communications and/or a non-cellular communication conduit, such as a Wi-Fi network. It should be understood that the communications may pass through additional network components (not shown), such as a base station or access point.

Figure 6A:
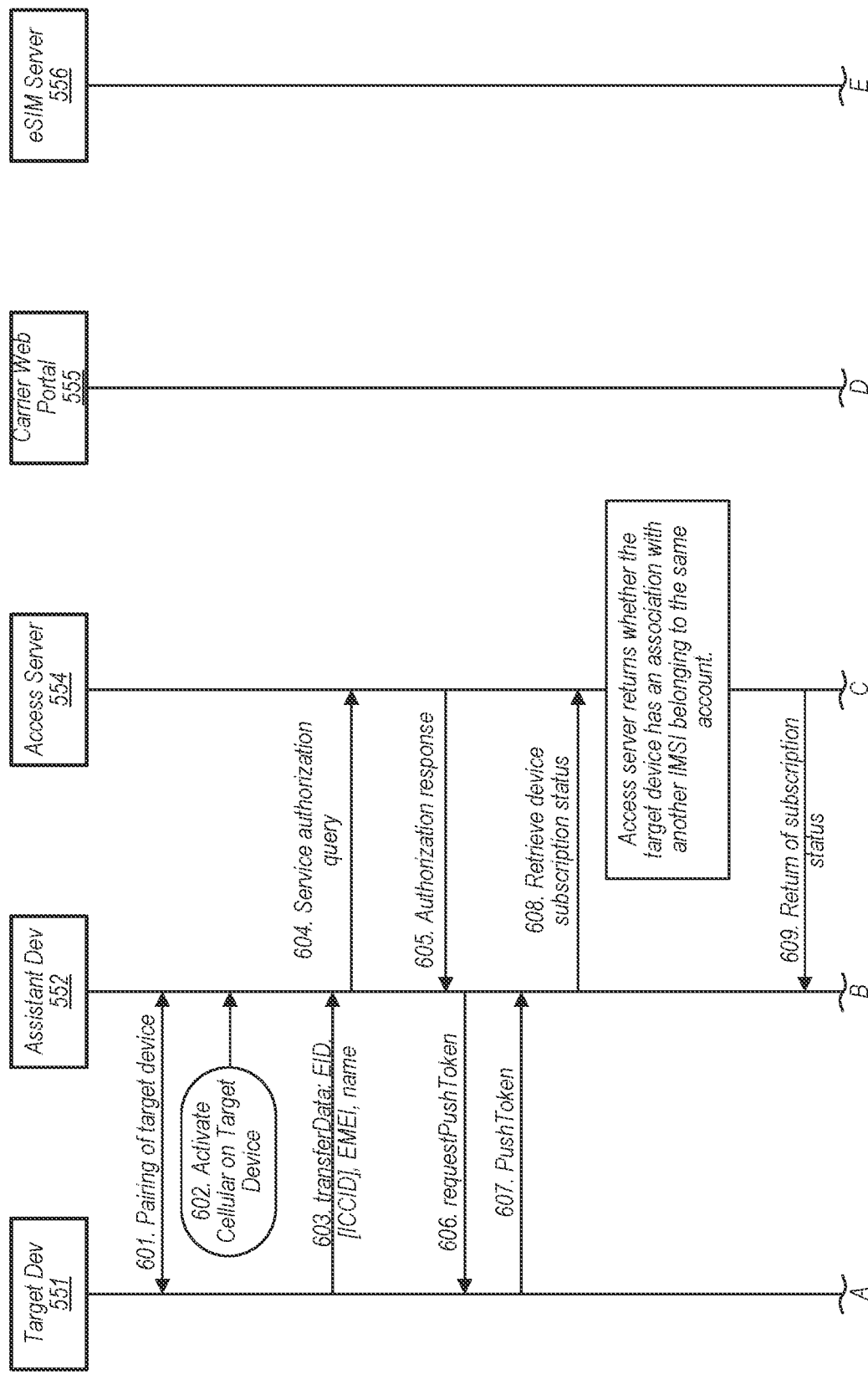
FIGS. 6A-6C illustrate an example signal flow diagram for initiating cellular service for a target device, consistent with the methods and systems illustrated in FIG. 4 and FIG. 5, but including additional optional details, according to some embodiments.
Figure 6B:
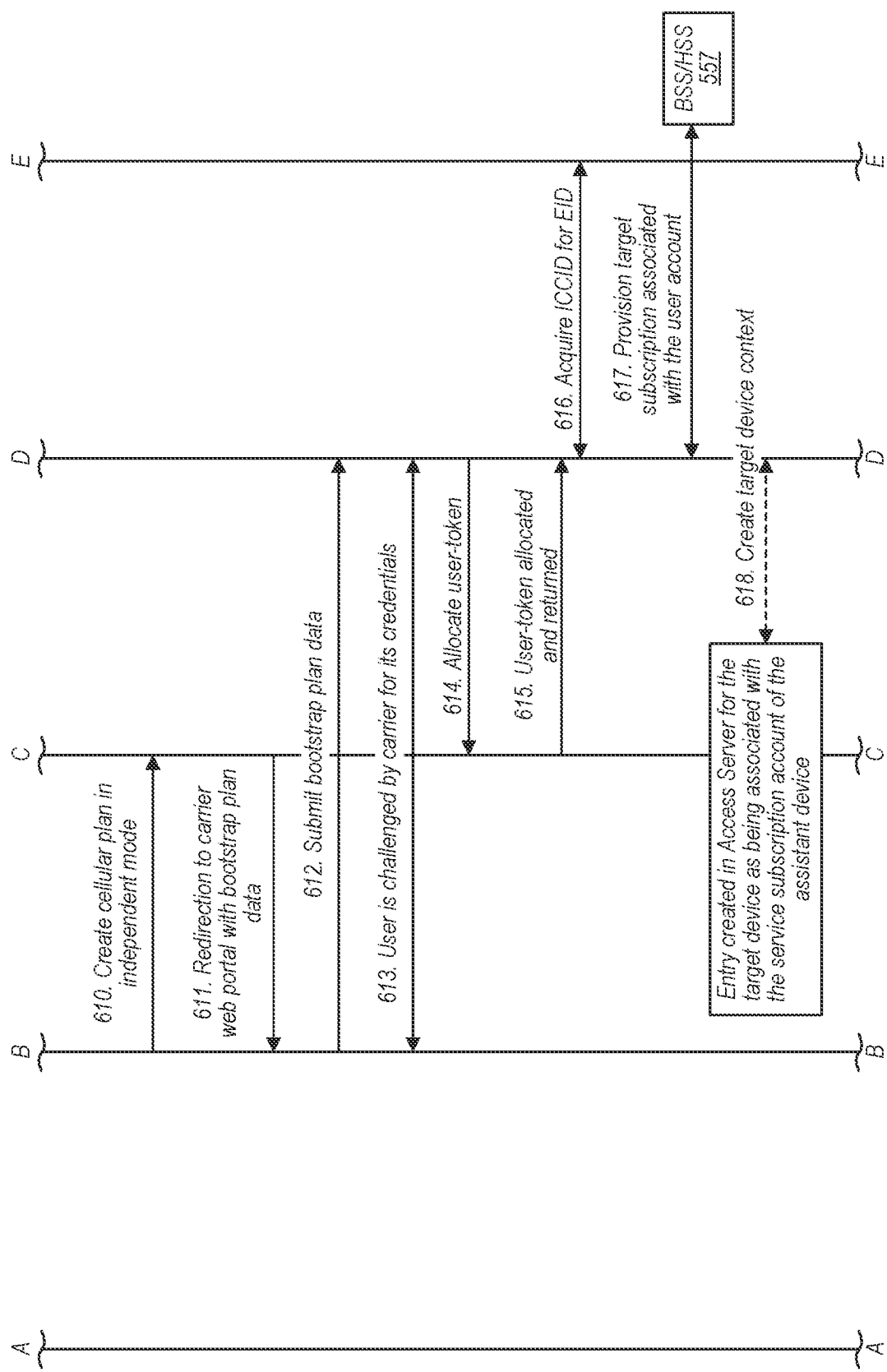
Figure 6C:
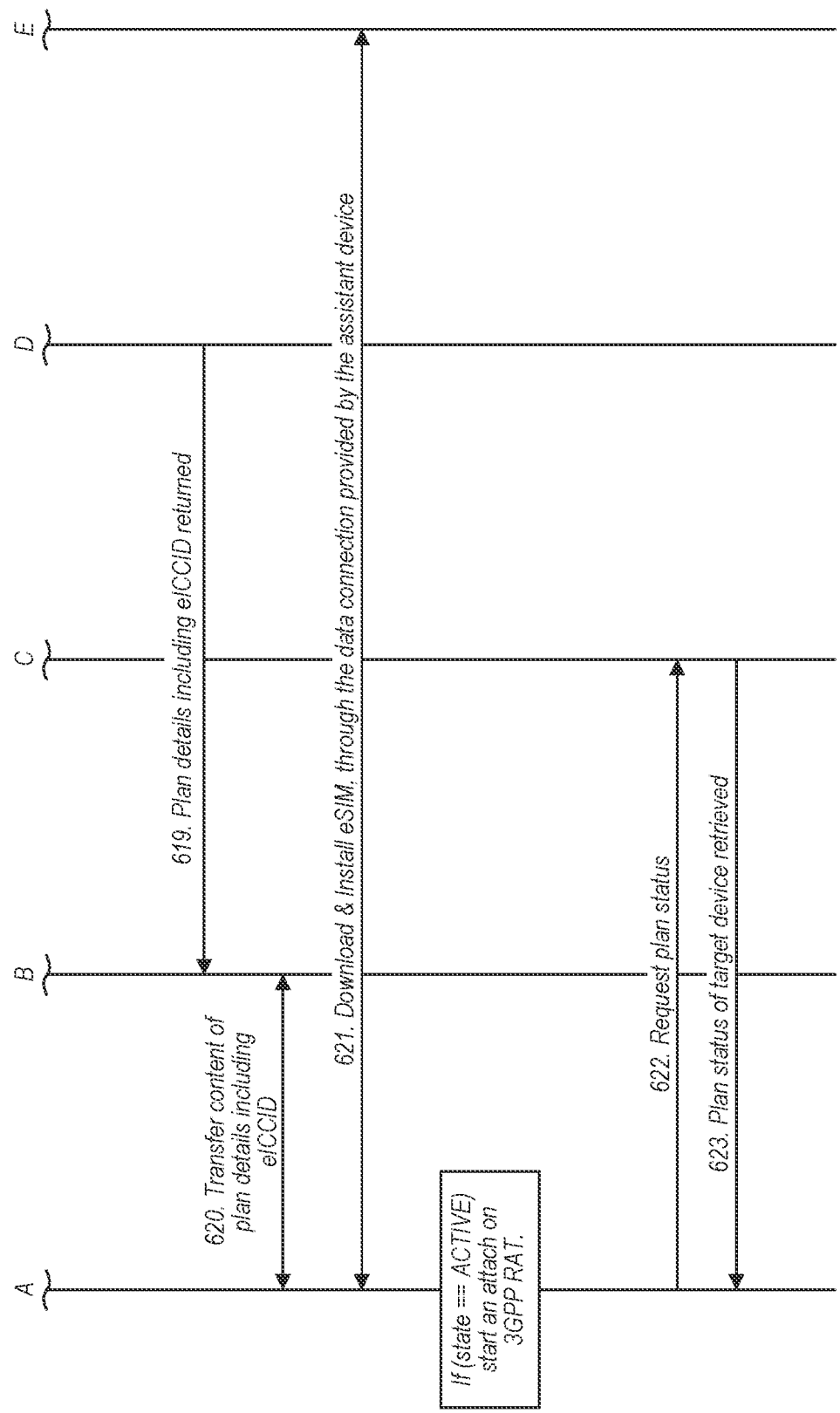

FIGS. 6A-6C illustrate an example signal flow diagram for initiating cellular service for a target device, consistent with the methods and systems illustrated in FIG. 4 and FIG. 5, but including additional optional details, according to some embodiments.

As shown in FIG. 6, the target device 551 and the assistant device 552 may perform device pairing, e.g., via a short-range wireless communication protocol, such as Wi-Fi or Bluetooth. At 602, the assistant device 552 may receive an instruction to activate cellular capability for the target device 551. For example, this instruction may be received from a user, e.g., through a step similar to that discussed at 501. At 603, the target device 551 may transmit to the assistant device 552 information identifying the target device 551, such as an EID, ICCID, EMEI, device name etc., e.g., as discussed at 502. In some scenarios, the target device 551 may transmit the information at 603 in response to the pairing of 601. In some scenarios, the target device 551 may transmit the information at 603 in response to a communication from the assistant device 552, responsive to receiving the instruction at 602.

Signals 604-609 of FIG. 6 illustrate further optional details of the communications previously illustrated as message exchange 503. At 604, the assistant device 552 may, responsive to receiving the instruction at 602, transmit to the access server 554, a service authorization query. The service authorization query may initiate an authentication procedure, e.g., to verify that the assistant device 552 is trusted by the cellular service provider. In response, the access server 554 may, at 605, transmit to the assistant device 552 an authorization response, confirming that the assistant device 552 is trusted by the cellular service provider. At 606, the assistant device 552 may transmit to the target device 551 a request for the push token of the target device 551. The target device 551 may respond at 607 by providing the push token to the assistant device 552. The assistant device 552 may convey the push token to the access server 554, e.g., at 608. The push token may identify the target device 551 within a push-notification service network. At 608, the assistant device 552 may provide to the access server 554 a request for device subscription status of the target device 551. In response, the access server 554 may, at 609, provide to the assistant device 552 a report of whether the target device 551 has an active service subscription account provided by the cellular service provider. In some scenarios, the report may indicate whether the target device 551 has an association with another IMSI belonging to the same service subscription account as the assistant device. In some scenarios, the report may include a list of devices associated with the same account as the assistant device 552.

In response to determining that the report of 609 indicates that the target device 551 does not have an association with another IMSI belonging to the same service subscription account as the assistant device, the assistant device 552 may, at 610, provide to the access server 554 a request to create a cellular plan for the target device 551 in independent mode, e.g., substantially as discussed at 504. In some scenarios, the request of 510 may include additional instructions or information, such as the notification push token of the target device, and/or an instruction to enable push notifications to/from the independent target device, e.g., as discussed at 406.

At 611, the access server 554 may respond by providing to the assistant device 552 an instruction redirecting the service initiation request to the carrier web portal 555, substantially as discussed at 505. The instruction of 611 may include plan data for the cellular plan.

In response, the assistant device 552 may, at 612, provide to the carrier web portal 555 a redirected request to initiate service for the target device 551, substantially as discussed at 506. The redirected request may include the plan data from the instruction of 611. In the scenario illustrated in FIG. 6, the redirected request does not include a trust flag. Therefore, the carrier web portal 555 may, at 613, challenge the assistant device 552 for security credentials (e.g., user name and password), and negotiate a trust relationship with the assistant device 552 through an exchange of credentials.

Once a trust relationship has been established, the carrier web portal 555 may, at 614, provide to the access server 554 an instruction to allocate a user token for the target device 551, and the access server 554 may, at 615, allocate the user token and provide it to the carrier web portal 555, substantially as discussed at 507.

At 616, the carrier web portal 555 may communicate with the eSIM server 556, substantially as discussed at 508. Specifically, the carrier web portal 555 may obtain from the eSIM server 556 an ICCID of an eSIM reserved for the target device 551.

At 617, the carrier web portal 555 may communicate with the carrier BSS/HSS system 557, substantially as discussed at 509.

At 618, the carrier web portal 555 may communicate with the access server 554 to create and/or obtain context for the target device. Such context may include further information regarding the target device 551. For example, the access server 554 may store information indicating that the target device 551 is associated with the service subscription account of the assistant device 552. The context information may be provided to the carrier web portal 555 by the access server 554.

At 619, the carrier web portal 555 may provide to the assistant device 552, an indication that the eSIM has been reserved, as well as the details of the service plan established for the target device 551, substantially as discussed at 510. As shown at 619, this may include providing the ICCID of the reserved eSIM.

At 620, the assistant device 552 may provide to the target device 551 the ICCID of the reserved eSIM, as well as other details of the service plan, address of the eSIM server 556, etc., substantially as discussed at 511.

At 621, the target device 551 may communicate with the eSIM server 556 to download and install the reserved eSIM, substantially as discussed at 512. As illustrated in FIG. 6, the target device 551 may communicate with the eSIM server 556 via a data connection provided by the assistant device 552.

Once the target device 551 has installed the eSIM, it may take steps to attach to the cellular communication network via the cellular RAT associated with the eSIM. Specifically, if the initial state of the eSIM is active, then the target device 551 may immediately initiate an attach procedure. Otherwise, the target device 551 may provide an inquiry to the access server 554, requesting a status update, to which the access server 554 may reply at 623. Once the access server 554 has notified the target device 551 that the eSIM is active, the target device 551 may initiate an attach procedure.

It should be understood that various modifications may be made to the signal flow illustrated in FIGS. 6A-6C, to provide alternative implementations of the method illustrated in FIG. 4. It should therefore be further understood that any of the optional details illustrated in FIGS. 6A-6C may be included in an implementation of FIG. 4 without requiring inclusion of all details illustrated in FIGS. 6A-6C.

Figure 7A:
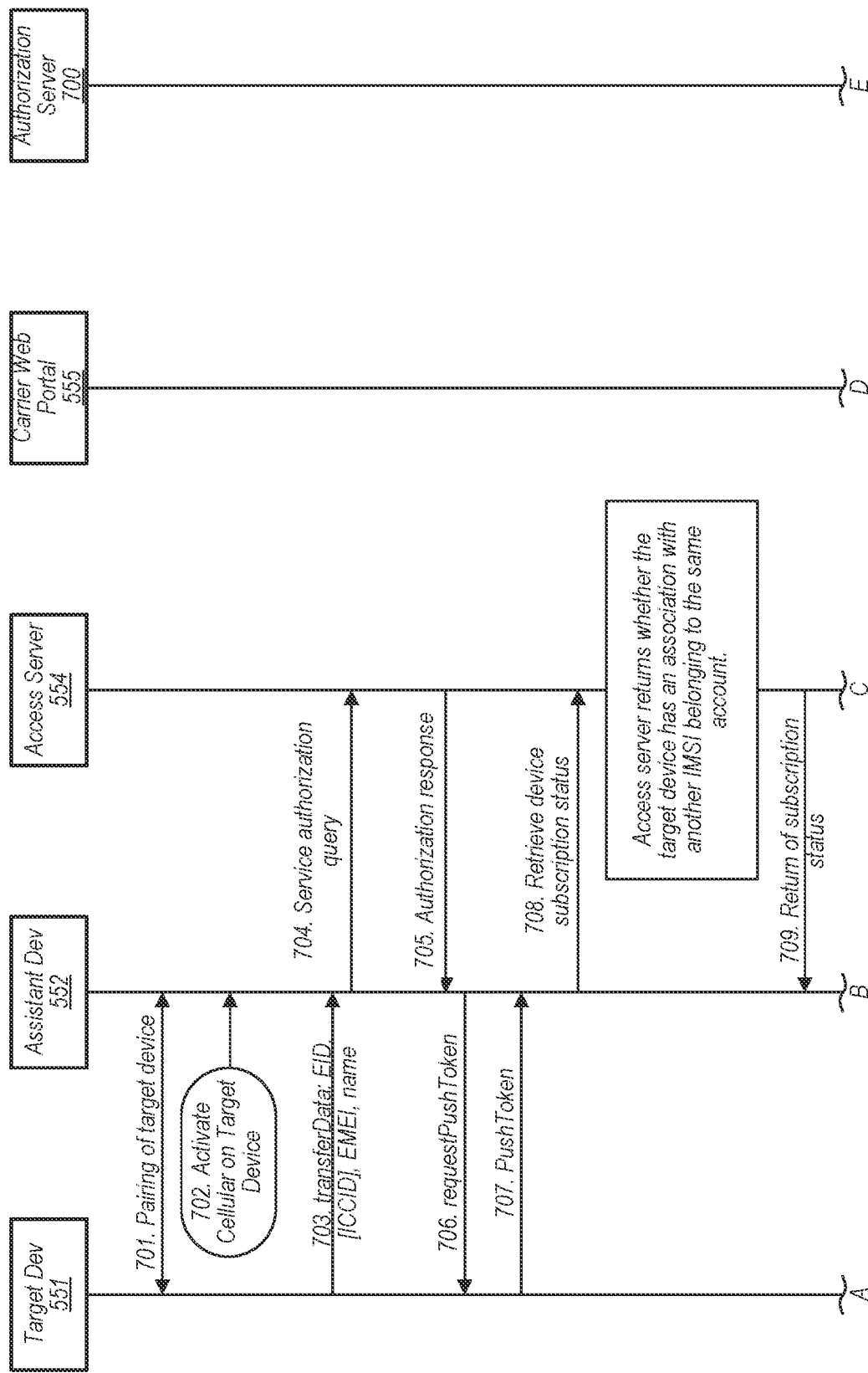
FIGS. 7A-7C illustrate an example signal flow diagram for initiating cellular service for a target device, consistent with the methods and systems illustrated in FIG. 4 and FIG. 5, but including additional optional details, according to some embodiments.
Figure 7B:
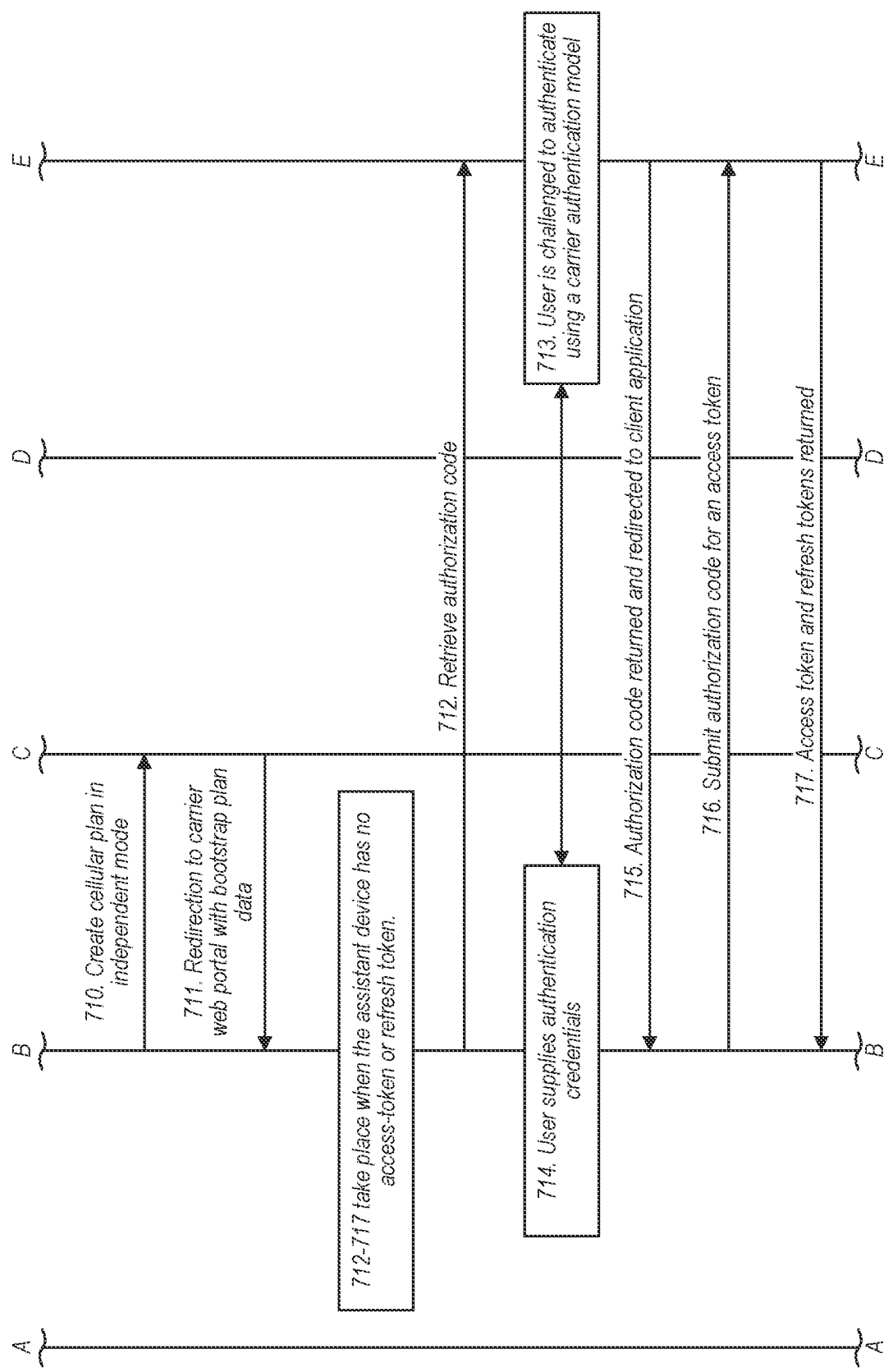
Figure 7C:
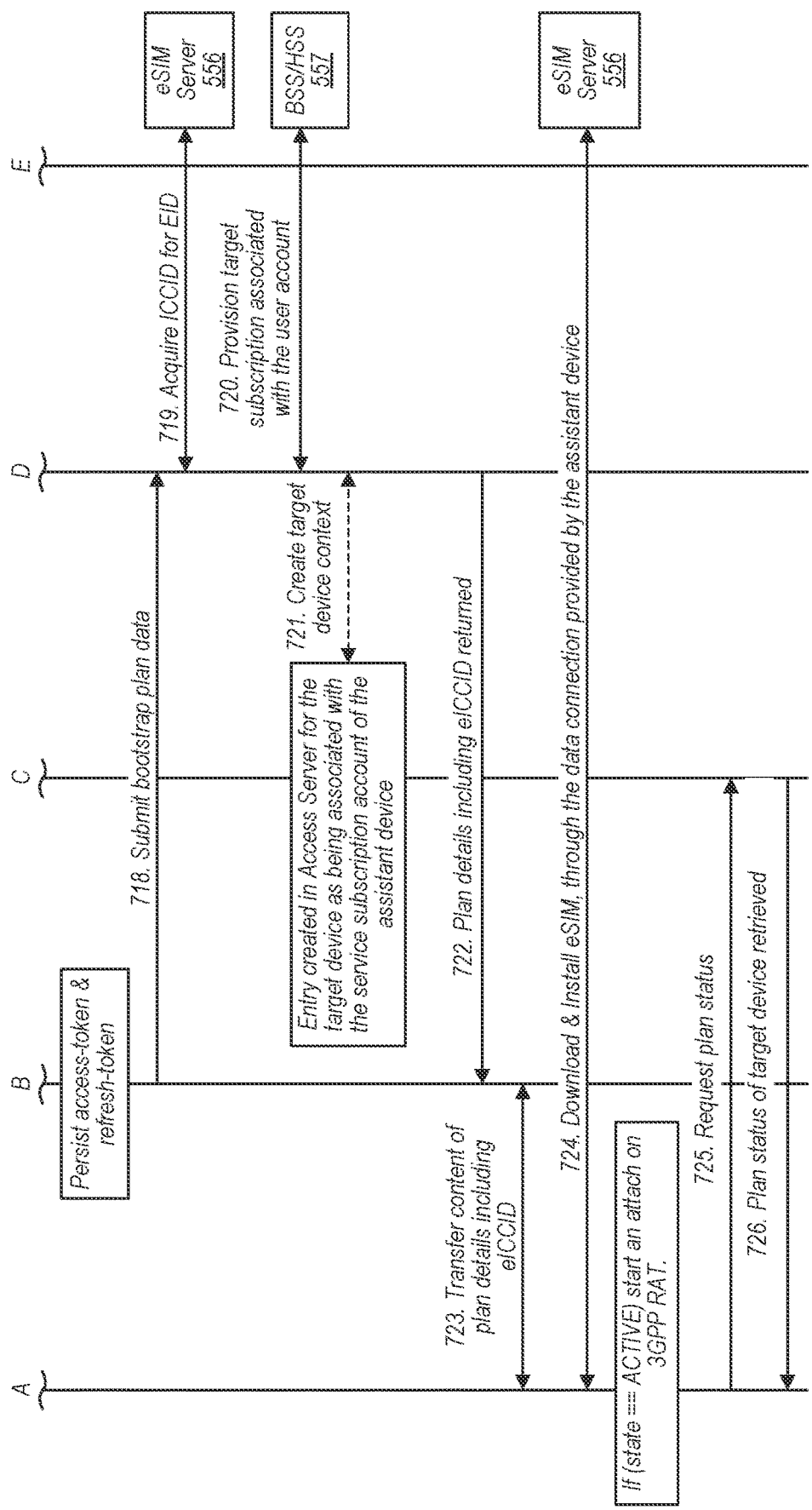

FIGS. 7A-7C illustrate an example signal flow diagram for initiating cellular service for a target device, consistent with the methods and systems illustrated in FIG. 4 and FIG. 5, but including additional optional details, according to some embodiments. Specifically, FIGS. 7A-7C illustrate a scenario in which the OAuth standard is used for user authentication.

As illustrated in FIG. 7, 701-711 may be equivalent to 601-611. However, at 712, the assistant device 552 may communicate with an authorization server 700, instead of negotiating a trust relationship with the carrier web portal 555 by exchange of credentials.

The authorization server 700 shown in FIG. 7 may include one or more server and/or service configured to provide authorization/authentication of cellular communication devices requesting access to a system or server of the cellular service provider. For example, the authorization server 700 may present a user with a form requesting user name and password, or other user credentials. In response to receiving valid user credentials, the authorization server 700may issue a token to the assistant device 552. The assistant device 552 may use the token in subsequent message exchanges, rather than repeatedly providing the user credentials. According to the scenario of FIG. 7, the authorization server may operate according to the OAuth standard.

For example, if the assistant device does not currently have a token issued by the authorization server 700, then, at 712-117, the assistant device may take steps to obtain such a token. At 712, the assistant device 552 may retrieve an authorization code from the authorization server 700, which request may initiate a negotiation involving exchange of authorization credentials at. For example, at 713, the authorization server 700 may issue a security challenge, and at 714 the assistant device 552 may respond with authentication credentials, e.g., as received from a user. If the negotiation is successful, then the authorization server 700 may provide to the assistant device 552 an authorization code, as requested at 712, which may be stored by a client application running on the assistant device 552. At 716, the assistant device 552 may request an access token from the authentication server 700, the request including the authorization code obtained at 715. In response, the authorization server 700 may, at 717, provide to the assistant device 552 an access token and a refresh token.

If the assistant device 552 has previously obtained an access token, then 712-717 may be omitted.

At 718, the assistant device 552 may provide to the carrier web portal 555 a redirected request to initiate service for the target device 551, substantially as discussed at 506. The redirected request may include the access token issued by the authorization server 700. Therefore, the carrier web portal 555 may consider the assistant device 552 to be trusted, without performing further authentication.

The remaining signals 719-726 may be equivalent to 616-623.

It should be understood that various modifications may be made to the signal flow illustrated in FIGS. 7A-7C, to provide alternative implementations of the method illustrated in FIG. 4. It should therefore be further understood that any of the optional details illustrated in FIGS. 7A-7C may be included in an implementation of FIG. 4 without requiring inclusion of all details illustrated in FIGS. 7A-7C.

Figure 8A:
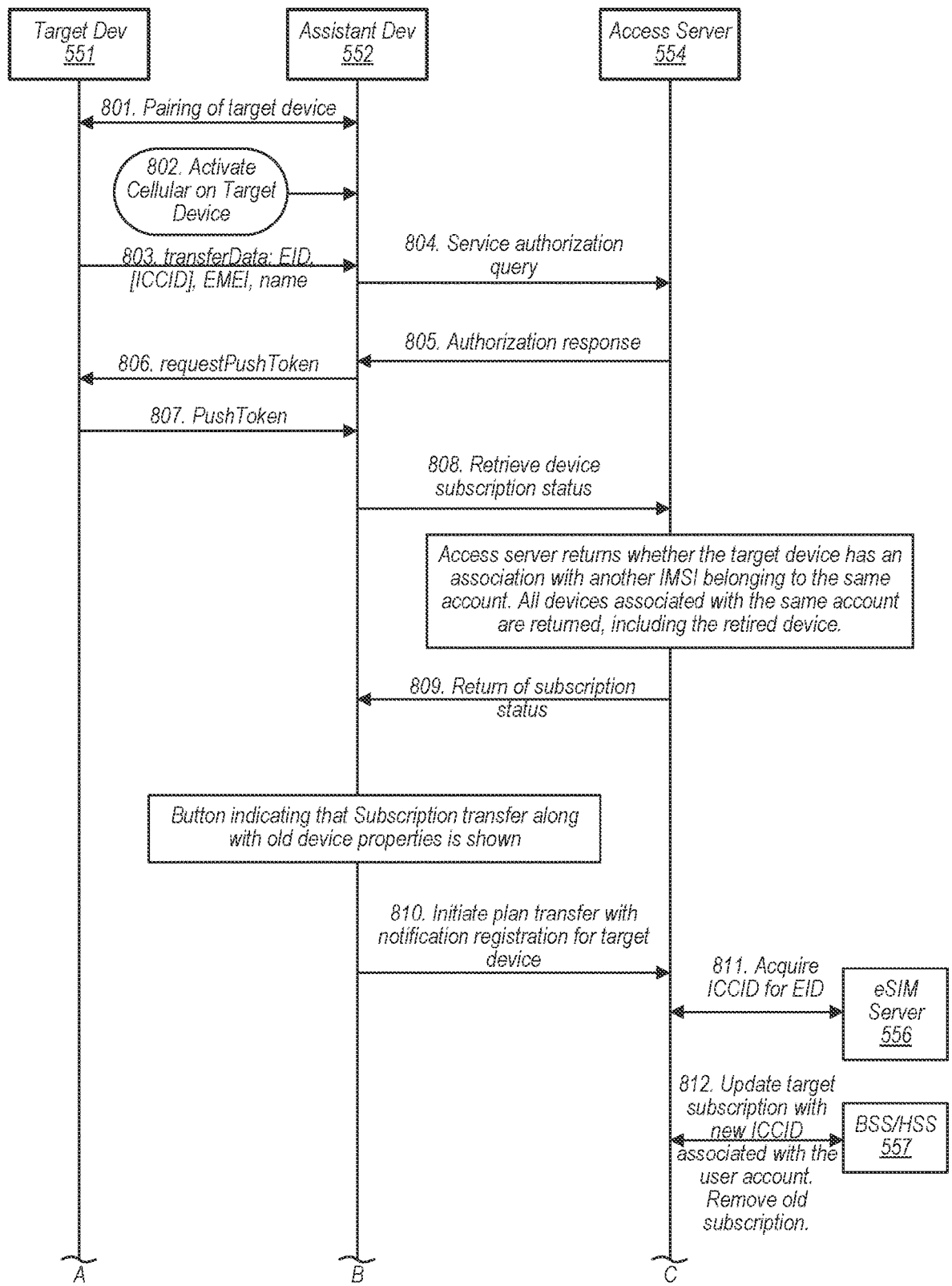
FIGS. 8A-8B illustrate an example signal flow diagram for initiating cellular service for a target device, consistent with the methods and systems illustrated in FIG. 4 and FIG. 5, but including additional optional details, according to some embodiments.
Figure 8B:
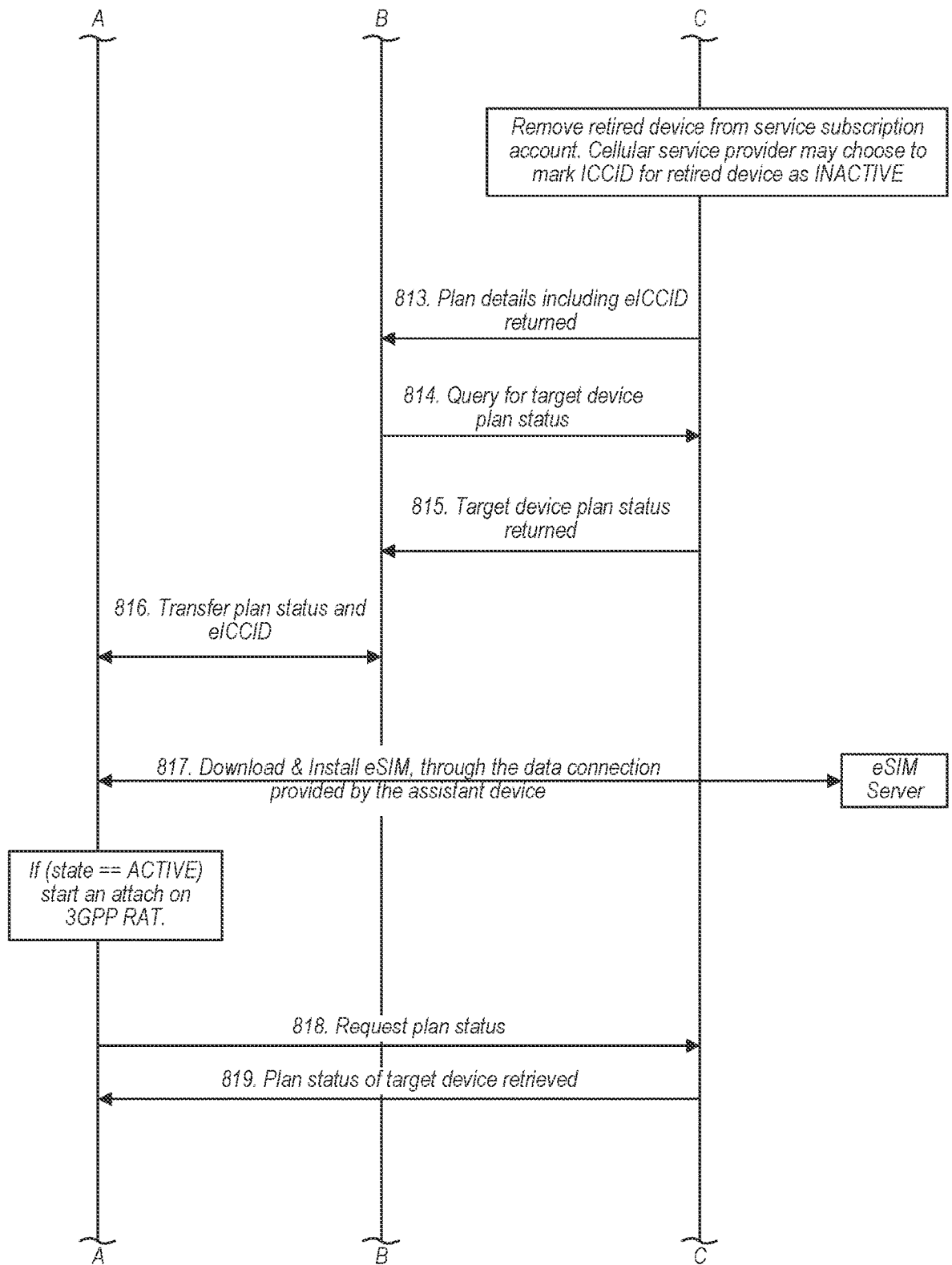

FIGS. 8A-8B illustrate an example signal flow diagram for initiating cellular service for a target device, consistent with the methods and systems illustrated in FIG. 4 and FIG. 5, but including additional optional details, according to some embodiments. Specifically, FIGS. 8A-8B illustrate a scenario in which a subscription is being transferred from a third cellular communication device (a "retired device") to the target device 551.

As illustrated in FIG. 8, 801-809 may be equivalent to 601-609. However, at 809, it may be noted that the report received by the assistant device 552 may include a list of devices associated with the same account as the assistant device 552, which includes the retired device. In some scenarios, the retired device may have been previously identified to the assistant device 552, e.g., by a user (e.g., at 802) or by the retired device itself.

In response to receiving the report at 809, confirming the subscription status of the devices associated with the same account as the assistant device 552, the assistant device 552 may receive instruction, e.g., from a user, to initiate a transfer of a subscription from the retired device to the target device 551. For example, a client application running on the assistant device 552 may display a button or other input option to solicit such instruction from the user.

At 810, in response to the instruction, the assistant device 552 may provide to the access server 554 a request to initiate transfer of the subscription. The request may also include additional instructions or information, such as the notification push token of the target device 551, and/or an instruction to enable push notifications to/from the target device 551.

At 811, the access server 554 may communicate with the eSIM server 556 (either directly or via the carrier web portal 555) to obtain from the eSIM server 556 an ICCID of an eSIM reserved for the target device 551, substantially as discussed at 508. Because the signal flow of FIGS. 8A-8B provide for transferring an existing subscription from the retired device to the target device 551, this may, in some scenarios, be accomplished with minimal user interaction with the service provider; e.g., without selecting subscription settings or other details. Thus, in some scenarios, the access server 554 may communicate directly with the eSIM server 556, without involving the carrier web portal 555.

At 812, the access server 554 may communicate with the BSS/HSS system 557 (either directly or via the carrier web portal 555) to update the target subscription with the new ICCID obtained from the eSIM server 556 at 811, and to remove the old subscription information associated with the retired device. For example, updating the target subscription with the new ICCID may include associating the new ICCID with a MSISDN previously associated with an ICCID of the retired device. The association of the ICCID with the MSISDN may be removed. In some implementations, information identifying the retired device may be marked as inactive.

At 813, the access server 554 may provide to the assistant device 552 an indication that the eSIM has been reserved, as well as the details of the service plan established for the target device 551, substantially as discussed at 510. As shown at 813, this may include providing the ICCID of the reserved eSIM.

In some scenarios, the assistant device 552 may delay providing the plan details and ICCID until it has verified that the eSIM is active. To that end, the assistant device 552 may, at 814, query the access server 554 regarding the status of the subscription plan established for the target device 551. The access server may respond at 814, indicating that the subscription plan (e.g., the eSIM) is active.

The remaining signals 816-819 may be equivalent to 620-623.

It should be understood that various modifications may be made to the signal flow illustrated in FIGS. 8A-8B, to provide alternative implementations of the method illustrated in FIG. 4. It should therefore be further understood that any of the optional details illustrated in FIGS. 8A-8B may be included in an implementation of FIG. 4 without requiring inclusion of all details illustrated in FIGS. 8A-8B.

Figure 9:
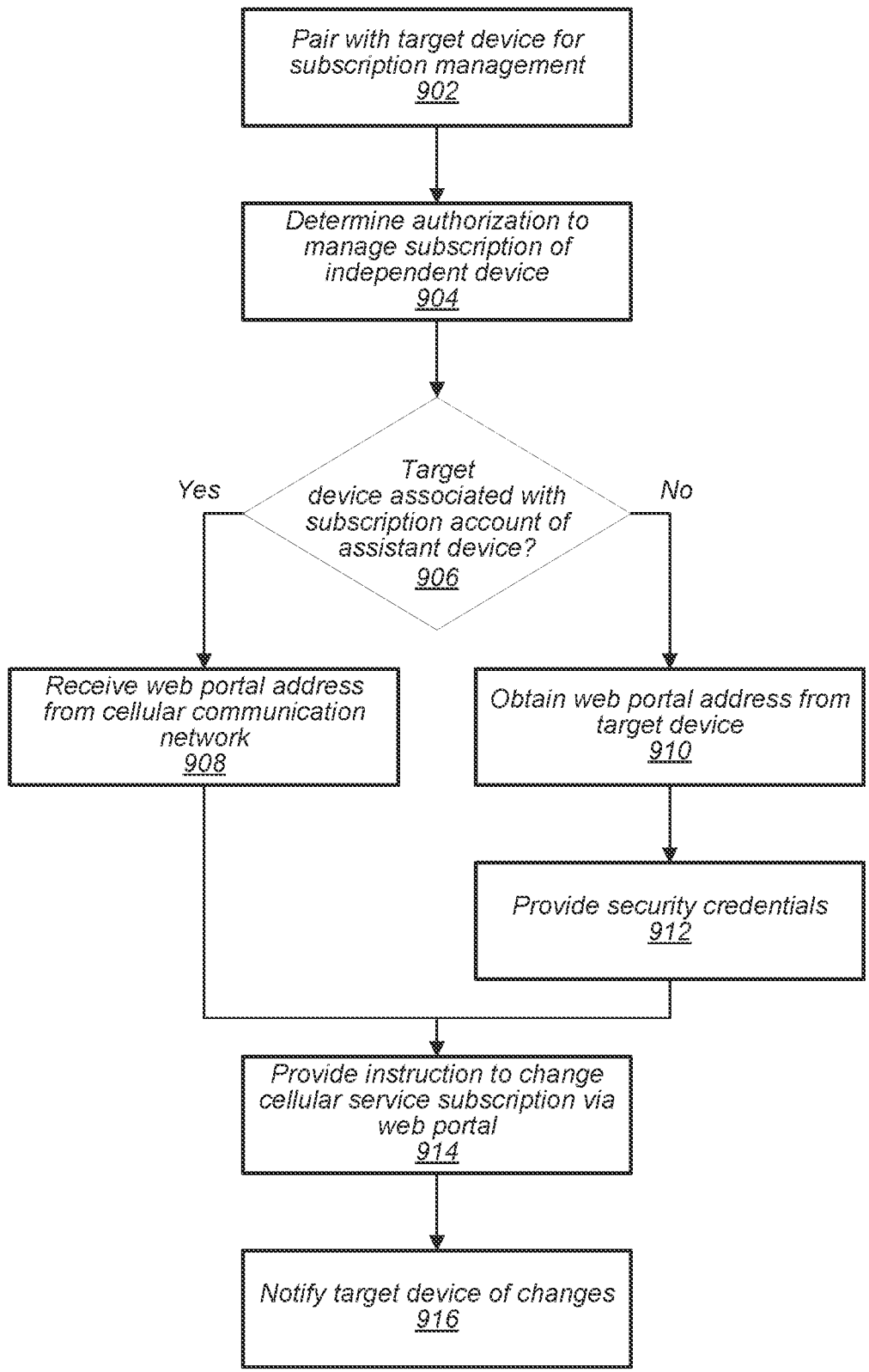
FIG. 9 illustrates an example method for managing a cellular service subscription for a target device via an assistant device, while the target device is in the independent mode, according to some embodiments.

FIGS. 9-11—Managing a Cellular Service Subscription for an Independent Device

As noted above, one advantage to configuring the target device in the independent ("standalone") mode is that subsequent management of the cellular service subscription of the target device may be performed by cellular communication devices other than the assistant device that performed the initial activation of the cellular service subscription. For example, such management functions may include transitioning the target device from standalone mode to dependent mode; changing the cellular service subscription of the target device; suspending the cellular service subscription for a period of time; canceling the cellular service subscription; enabling/disabling carrier services such as roaming; etc.

FIG. 9 illustrates an example method for managing a cellular service subscription (or plan) for a target device, such as the secondary wireless device 107, via an assistant device, such as the UE 106, while the target device is in the independent mode, according to some embodiments. The assistant device need not be (although it may be) the same device that performed the initial activation of the cellular service subscription for the target device.

At 902, the assistant device may pair with the target device to perform subscription management for the target device. The pairing process may include exchanging information regarding the target device and the assistant device. Specifically, the assistant device may receive identifying information of the target device, such as an EID, ICCID, IMEI, CSN, device name, device type, and/or other identifying information. The assistant device may also receive an indication that the target device is operating in the independent mode. In some scenarios, 902 may be omitted.

At 904, the assistant device may determine whether it is authorized to perform management functions for devices in the independent mode. For example, the assistant device may provide a query to the cellular communication network to request whether the service plan of the assistant device includes such privileges, and may receive a response from the cellular communication network. Management functions may include, e.g., causing the target device to transition from the independent mode to dependent mode and associating the target device with the assistant device. In some scenarios, 904 may be omitted.

At 906, the assistant device may determine whether the target device is associated with the same service subscription account as the assistant device. In some scenarios, 906 may be performed in response to determining at 904 that the assistant device is authorized to perform management functions for devices in independent mode. As one example, the assistant device may query the cellular communication network for information regarding devices that are associated with the same service subscription account as the assistant device ("linked devices"), and may receive a response from the cellular communication network.

Upon (e.g., in response to) determining that the target device is associated with the same service subscription account as the assistant device, the assistant device may, at 908, receive an address (e.g., a URL) for a web portal of the cellular communication network. For example, if the cellular communication network provides a response, at 906, that target device is associated with the same service subscription account as the assistant device, then the cellular communication network may include the address of the web portal in that response or in a subsequent communication. The web portal may be configured to provide an interface for the assistant device to access the service subscription account of the target device. For example, in some scenarios, the web portal may be equivalent to the carrier web portal 555 of FIG. 5.

In response to determining that the target device is not associated with the same service subscription account as the assistant device, the assistant device may, at 910 obtain (e.g., request and receive) the address of the web portal from the target device. In some scenarios, the target device (being in independent mode) may acquire the address of the web portal from the cellular communication network, e.g., in response to the request at 910, and may provide the address to the assistant device.

In scenarios in which the target device is not associated with the same service subscription account as the assistant device, the assistant device may be required, at 912, to provide security credentials (e.g., user name and password) in order to access the web portal.

At 914, the assistant device may access the web portal via the received address, and provide instruction to change one or more settings, parameters, etc. of the cellular service subscription of the target device.

At 916, the assistant device may notify the target device of the changes made.

Any reference to "the cellular communication network" in connection with the preceding description of FIG. 9 should be understood as including any of various network components, servers, and/or services, including various components provided by, maintained by, or interfacing with the cellular service provider. As a non-exhaustive, non-limiting list of examples, communicating with the cellular communication network may include at least communicating with an access server, an authorization server, a push notification server, a carrier web portal, an eSIM server, and/or various other portals or servers.

Figure 10A:
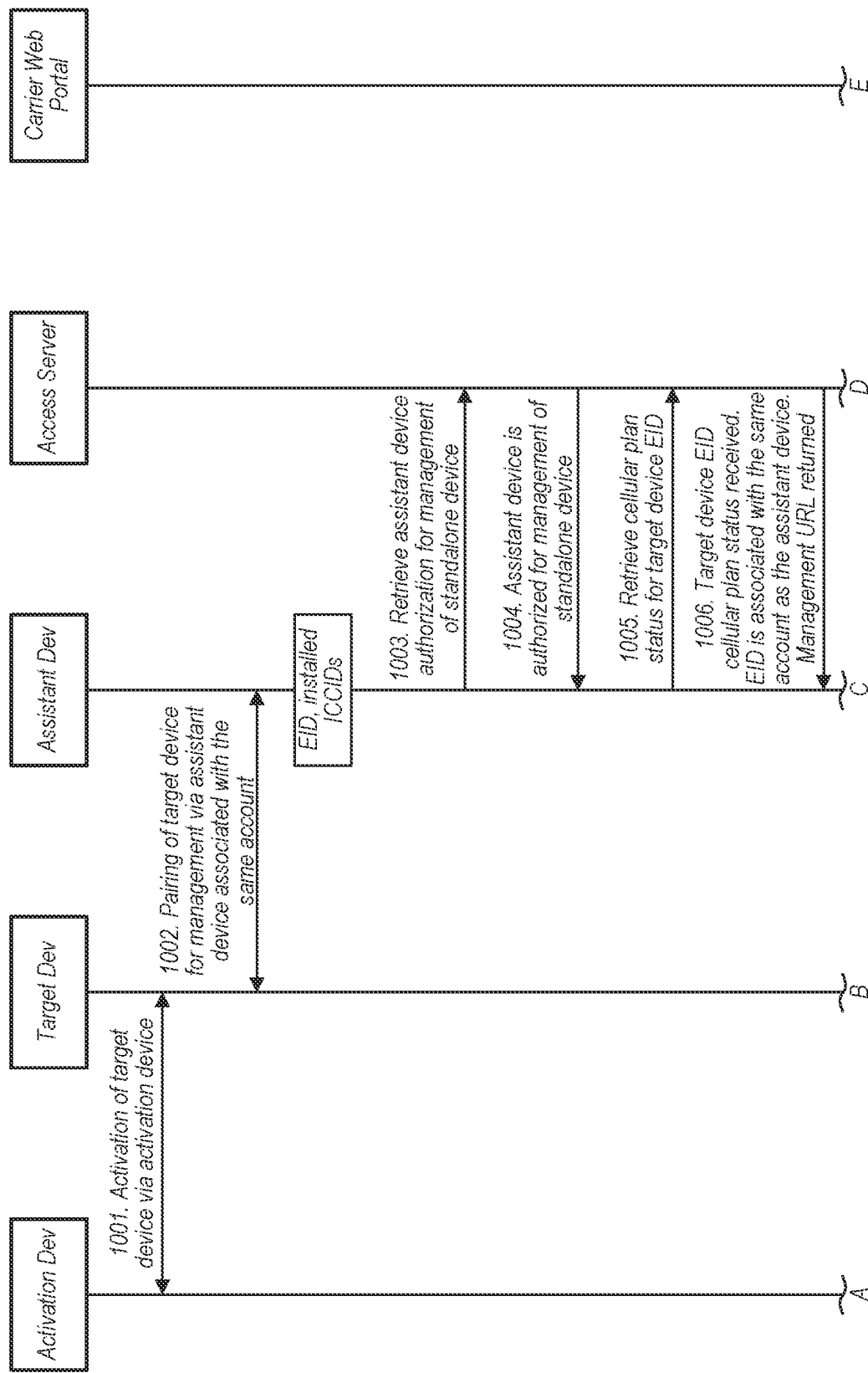
FIGS. 10A-10B illustrate an example signal flow diagram for managing a cellular service subscription for a target device via an assistant device while the target device is in the independent mode, wherein the target device is associated with the same service subscription account as the assistant device, according to some embodiments.
Figure 10B:
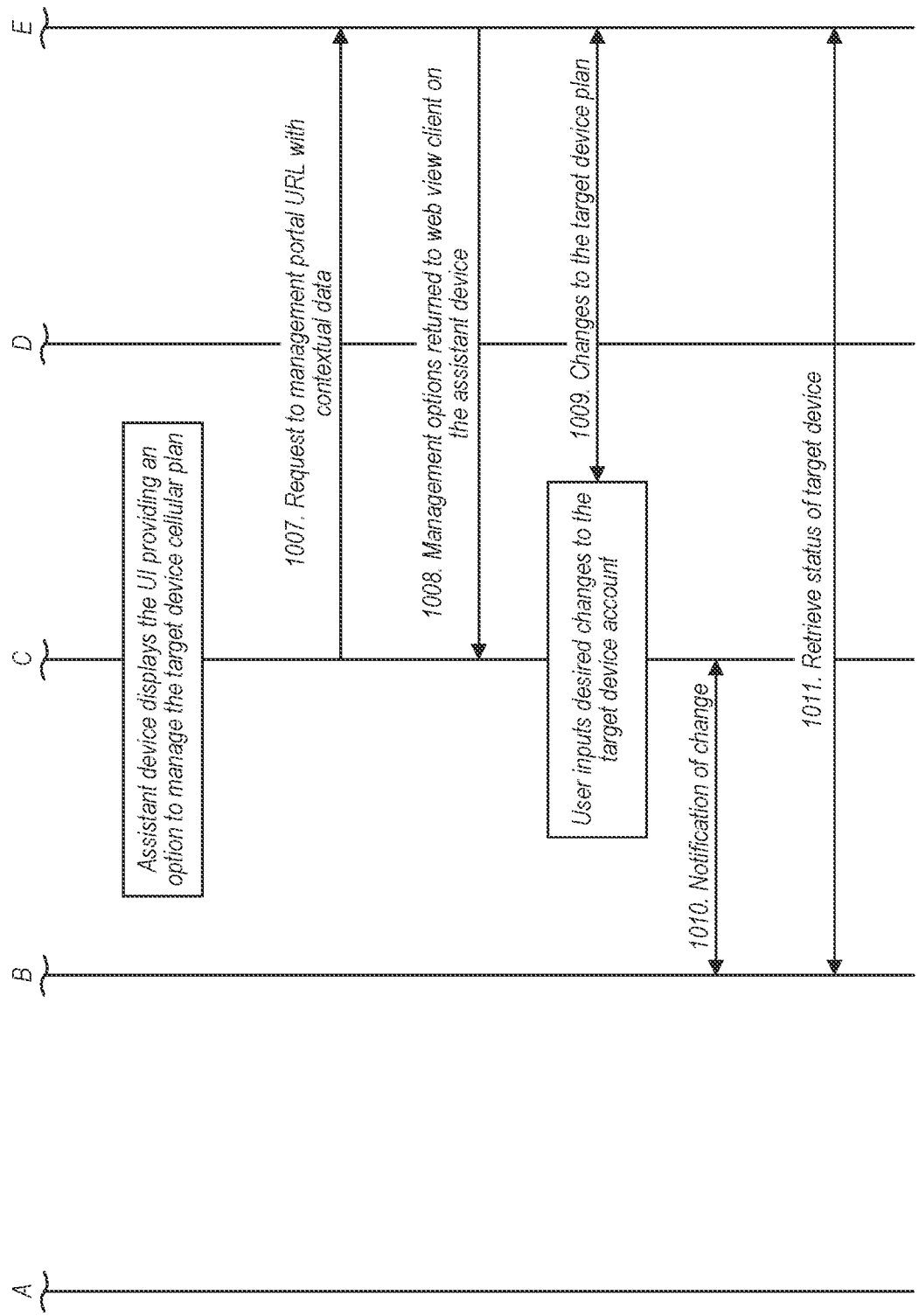

FIGS. 10A-10B illustrate an example signal flow diagram for managing a cellular service subscription for a target device via an assistant device while the target device is in the independent ("standalone") mode, consistent with the method illustrated in FIG. 9, but including additional optional details, according to some embodiments. In particular, FIGS. 10A-10B illustrate an example signal flow for a scenario in which the target device is associated with the same service subscription account as the assistant device. In the scenario illustrated, the target device is first activated in independent mode (e.g., according to any of the preceding methods) via an activation device. Subsequently, further management is performed by a different assistant device.

As shown in FIG. 10, the target device and the activation device may, at 1001, perform activation of the target device, e.g., according to any of the preceding methods. For example, the target device of FIG. 10 may be equivalent to the target device 551 of FIG. 5, and the activation device of FIG. 10 may be equivalent to the assistant device 552 of FIG. 5. In the scenario of FIG. 10, the target device is activated in the independent mode.

After activation of the target device, the target device and the assistant device may, at 1002, perform device pairing, e.g., via a short-range wireless communication protocol, such as Wi-Fi or Bluetooth, or via the activated cellular protocol, e.g., as discussed at 902.

Signals 1003-1004 of FIG. 10 illustrate further optional details of the communications previously discussed as 904. At 1003, the assistant device may provide to an access server a request for confirmation that the access server is authorized to manage devices in the independent mode, such as the target device. In some scenarios, the access server of FIG. 10 may be equivalent to the access server 554 of FIG. 5. In some scenarios, e.g., as illustrated in FIG. 10, the request may include, or consist of or take the form of, a cellular plan status inquiry. At 1004, the access server may respond with confirmation.

At 1005, the assistant device may provide to the access server a request for device subscription status of the target device. For example, the request may request a list of devices associated with the same account as the assistant device. In response, the access server may, at 1006, provide to the assistant device a report of whether the target device is associated with the same account as the assistant device. For example, the report may include a list of devices associated with the same account as the assistant device, which may or may not include the target device. In the scenario shown in FIG. 10, the report at 1006 indicates that the target device is associated with the same account as the assistant device; e.g., the report may include a list of devices associated with the same account as the assistant device, wherein the list includes the target device. The report may also include a URL or other address of a management portal for managing the subscription of the target device, e.g., as discussed at 908.

In response to receiving the report at 1006, the assistant device may receive instruction, e.g., from a user, to access a management functions for the target device. For example, a client application running on the assistant device may display a button or other input option to solicit such instruction from the user.

At 1007, the assistant device may provide to a client web portal a request for information from the management portal. For example, the information requested may include management options for managing the subscription of the target device. The request may include the URL or other address of the management portal. The request includes contextual data, which may provide information regarding the target device and the cellular service subscription, e.g., in an encrypted form. This contextual data may allow the carrier web portal to process the request.

In response, the client web portal may, at 1008 return to the assistant device management options for managing the subscription of the target device. In some scenarios, the management options may be provided to, and displayed by, a web view client or other user interface on the assistant device.

At 1009, the assistant device may communicate with the client web portal to provide instruction to change the cellular service subscription of the target device, e.g., as discussed at 914. For example, the assistant device may receive and relay instruction from a user interface. The instruction may be passed by the client web portal to the management portal. The assistant device may also receive from the client web portal (e.g., relayed from the management portal) confirmation that the change has been implemented.

In response, the assistant device may, at 1010, provide to the target device a notification of the change, e.g., as discussed at 916. In some scenarios, the target device may, at 1011, communicate with the client web portal (or with the management portal via the client web portal) to confirm the changes.

Communications between the assistant device and various network entities, such as the access server or the carrier web portal may be performed via cellular communications and/or a non-cellular communication conduit, such as a Wi-Fi network. It should be understood that the communications may pass through additional network components (not shown), such as a base station or access point.

It should be understood that various modifications may be made to the signal flow illustrated in FIGS. 10A-10B, to provide alternative implementations of the method illustrated in FIG. 9. It should therefore be further understood that any of the optional details illustrated in FIGS. 10A-10B may be included in an implementation of FIG. 9 without requiring inclusion of all details illustrated in FIGS. 10A-10B.

Figure 11A:
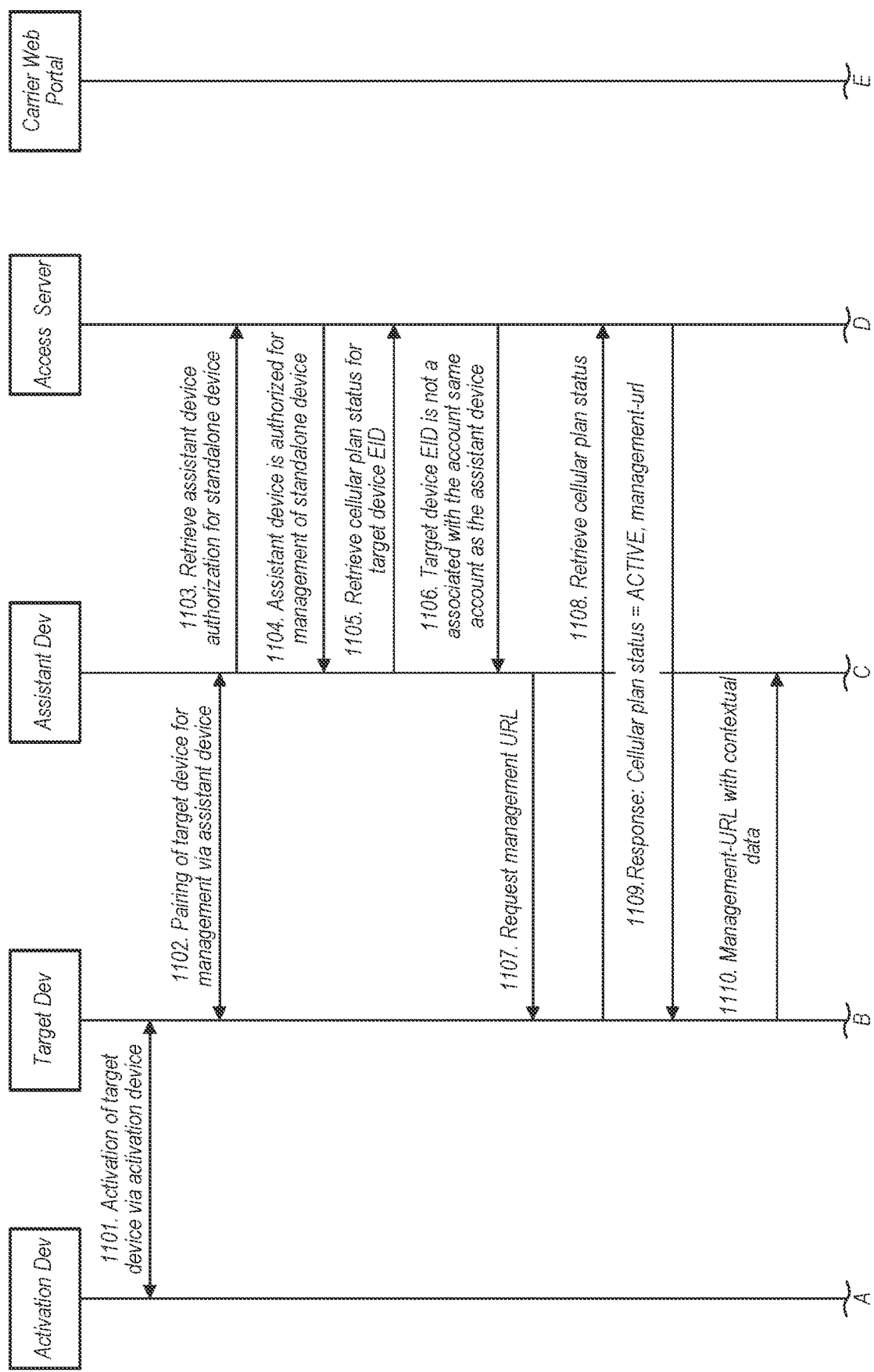
FIGS. 11A-11B illustrate an example signal flow diagram for managing a cellular service subscription for a target device via an assistant device while the target device is in the independent mode, wherein the target device is not associated with the same service subscription account as the assistant device, according to some embodiments.
Figure 11B:
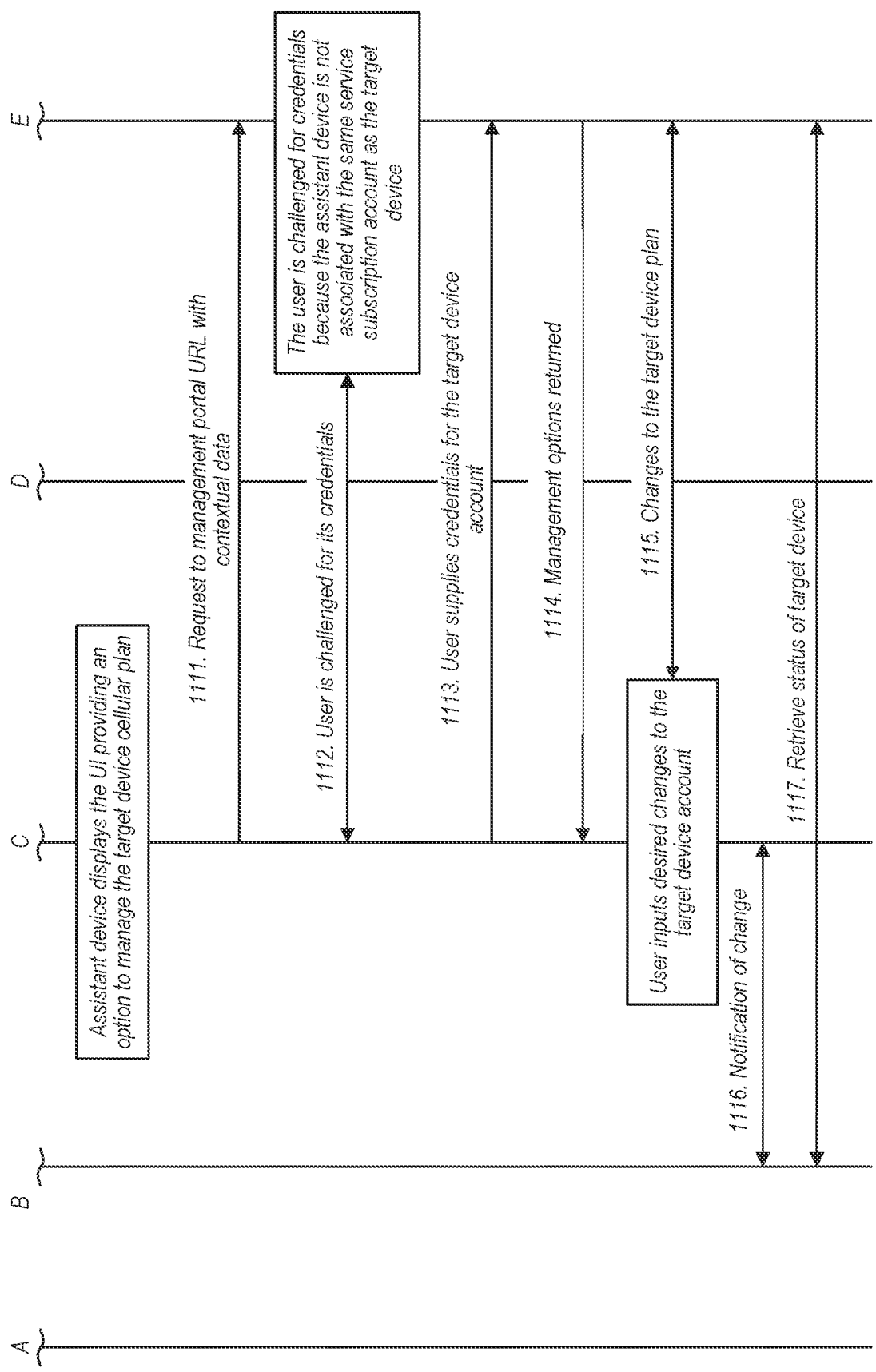

FIGS. 11A-11B illustrate an example signal flow diagram for managing a cellular service subscription for a target device via an assistant device while the target device is in the independent ("standalone") mode, consistent with the method illustrated in FIG. 9, but including additional optional details, according to some embodiments. In particular, FIGS. 11A-11B illustrate an example signal flow for a scenario in which the target device is not associated with the same service subscription account as the assistant device. For example, the target device may have been activated in an independent mode, being associated with a first cellular plan. As a specific, non-limiting example, the target device may have been activated at a point of sale, and may be associated with a personal consumer cellular service plan. The assistant device may be associated with a second, different cellular plan. As a specific, non-limiting example, the assistant device may be associated with a corporate plan with the same cellular service provider as the personal consumer cellular service plan. However, the second cellular plan (or the assistant device associated with the second cellular plan) may have authorization to pair another device for subscription management purposes.

As shown in FIG. 11, the signals 1101-1105 may be equivalent to 1001-1005. However, in the scenario of FIG. 11, the report received at 1106 indicates that the target device is not associated with the same account as the assistant device. For example, the report may include a list of devices associated with the same account as the assistant device, wherein the list does not include the target device. The report does not include a URL or other address of a management portal for managing the subscription of the target device.

In response to receiving the report at 1106, the assistant device may take steps to obtain, from the target device, a URL or other address of the management portal, substantially as discussed at 910. Specifically, signals 1107-1110 of FIG. 11 illustrate further optional details of the communications previously discussed as 910. At 1107, the assistant device may provide to the target device a request for the URL or other address of the management portal. At 1108, the target device may provide a request for information from the access server. For example, as illustrated, the target device may provide a cellular plan status inquiry, similar to that of 1105. For example, the status plan inquiry may request a list of devices associated with the same account as the target device. In response, the access server may, at 1109, provide to the target device a report including a list of devices associated with the same account as the target device. Because the target device is included on that list, the report at 1009 may also include the URL or other address of a management portal for managing the subscription of the target device, similar to the report of 1006. In some scenarios, the report may also indicate the status of the cellular service plan of the target device, which is active in the scenario illustrated in FIG. 11. At 1110, the target device may provide to the assistant device the URL or other address of the management portal.

In response to receiving the address of the management portal at 1110, the assistant device may receive instruction, e.g., from a user, to access a management functions for the target device. For example, a client application running on the assistant device may display a button or other input option to solicit such instruction from the user.

At 1111, the assistant device may provide to a client web portal a request for information from the management portal. For example, the information requested may include management options for managing the subscription of the target device. The request may include the URL or other address of the management portal. The request may include contextual data.

In response, the client web portal, or the management portal via the client web portal, may, at 1112, provide a security challenge to the assistant device, e.g., because the assistant device is not associated with the same service subscription account as the target device, which it is attempting to manage. At 1113, the assistant device may provide to the client web portal (or to the management portal via the client web portal) authentication credentials to establish a trust relationship.

The remaining signals 1114-1117 may be equivalent to 1008-1011.

Communications between the assistant device and various network entities, such as the access server or the carrier web portal may be performed via cellular communications and/or a non-cellular communication conduit, such as a Wi-Fi network. It should be understood that the communications may pass through additional network components (not shown), such as a base station or access point.

It should be understood that various modifications may be made to the signal flow illustrated in FIGS. 11A-11B, to provide alternative implementations of the method illustrated in FIG. 9. It should therefore be further understood that any of the optional details illustrated in FIGS. 11A-11B may be included in an implementation of FIG. 9 without requiring inclusion of all details illustrated in FIGS. 11A-11B.

Example Implementations

In conjunction with the preceding discussion, the following paragraphs provide specific examples of implementations of the disclosed features.

A method for initiating cellular service for a first cellular communication device via a second cellular communication device may be performed by the second cellular communication device. The method may include providing, to a cellular communication network, a request to initiate cellular service for the first cellular communication device, the request comprising an indication that the cellular service should support standalone operation for the first cellular communication device; receiving, from the cellular communication network, an indication that an embedded Subscriber Identity Module (eSIM) has been reserved for the first cellular communication device, wherein the indication comprises an ICCID of the eSIM; and providing the ICCID to the first cellular communication device.

In some scenarios, the method may further include relaying, from the first cellular communication device to the cellular communication network, a message requesting provision of the eSIM reserved for the first cellular communication device; and relaying, from the cellular communication network to the first cellular communication device, the eSIM reserved for the first cellular communication device.

In some scenarios, the method may further include receiving from the cellular communication network an indication that the eSIM reserved for the first cellular communication device has been activated.

In some scenarios, the method may further include receiving a notification push token from the first cellular communication device; and providing to the cellular communication network a request to activate push notifications to the first cellular communication device using the received notification push token.

In some scenarios, providing the request to initiate cellular service for the first cellular communication device is responsive to receiving, from the cellular communication network, a confirmation that no cellular service subscription for the first cellular communication device is currently associated with a subscription account associated with the second cellular communication device.

In some scenarios, the method may further include performing an authentication procedure with the cellular communication network, the authentication procedure comprising receiving an authentication token from the cellular communication network, the authentication token indicating a trusted relationship with the cellular communication network; and including the authentication token in the request to initiate cellular service for the first cellular communication device.

In some scenarios, the method may further include receiving identification information of a third cellular communication device, wherein the request to initiate cellular service for the first cellular communication device includes the identification information of the third cellular communication device and an instruction to associate the first cellular communication device with a Mobile Station International Subscriber Directory Number (MSISDN) previously associated with the third cellular communication device.

A method for managing a cellular service subscription of a first cellular communication device via a second cellular communication device may be performed by the second cellular communication device. The method may include receiving an address of a web portal for managing the cellular service subscription of the first cellular communication device while the first cellular communication device is in an independent mode; providing, to the web portal, an instruction to modify the cellular service subscription of the first cellular communication device; and notifying the target device of the modifications to the cellular service subscription.

In some scenarios, the address of the web portal may be received from the cellular communication network. In some scenarios, the address of the web portal may be received from the first cellular communication device.

In some scenarios, the method may further include determining whether the first cellular communication device is associated with a subscription account of the second cellular communication device; and, in response to determining that the first cellular communication device is not associated with the subscription account of the second cellular communication device, providing, to the first cellular communication device, a request for the address of the web portal.

In any of the preceding scenarios, the method may further include receiving identification information of the first cellular communication device.

In any of the preceding scenarios, the method may further include determining that the second cellular communication device is authorized by the cellular communication network to perform subscription management functions for a device in independent mode.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a secondary device 107, or any one or more of the servers or systems illustrated in any of the figures) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for initiating cellular service for a first cellular communication device via a second cellular communication device, the method comprising:
by the second cellular communication device:
providing, to a cellular communication network, a request to initiate cellular service for the first cellular communication device, the request comprising an indication that the cellular service should support standalone operation for the first cellular communication device;
receiving, from the cellular communication network, an indication that an embedded Subscriber Identity Module (eSIM) has been reserved for the first cellular communication device, wherein the indication comprises an ICCID of the eSIM; and
providing the ICCID to the first cellular communication device.

2. The method of claim 1, further comprising:
relaying, from the first cellular communication device to the cellular communication network, a message requesting provision of the eSIM reserved for the first cellular communication device; and relaying, from the cellular communication network to the first cellular communication device, the eSIM reserved for the first cellular communication device.

3. The method of claim 1, further comprising:
receiving from the cellular communication network an indication that the eSIM reserved for the first cellular communication device has been activated.

4. The method of claim 1, further comprising:
receiving a notification push token from the first cellular communication device; and
providing to the cellular communication network a request to activate push notifications to the first cellular communication device using the received notification push token.

5. The method of claim 1, wherein providing the request to initiate cellular service for the first cellular communication device is responsive to receiving, from the cellular communication network, a confirmation that no cellular service subscription for the first cellular communication device is currently associated with a subscription account associated with the second cellular communication device.

6. The method of claim 1, further comprising:
performing an authentication procedure with the cellular communication network, the authentication procedure comprising receiving an authentication token from the cellular communication network, the authentication token indicating a trusted relationship with the cellular communication network; and
including the authentication token in the request to initiate cellular service for the first cellular communication device.

7. The method of claim 1, further comprising:
receiving identification information of a third cellular communication device, wherein the request to initiate cellular service for the first cellular communication device includes the identification information of the third cellular communication device and an instruction to associate the first cellular communication device with a Mobile Station International Subscriber Directory Number (MSISDN) previously associated with the third cellular communication device.

8. A second cellular communication device comprising:
a memory having software instructions stored thereon; and
one or more processors configured to execute the software instructions to:
provide, for transmission to a cellular communication network, a request to initiate cellular service for a first cellular communication device, the request comprising an indication that the cellular service should support standalone operation for the first cellular communication device;
receive, from the cellular communication network, an indication that an embedded Subscriber Identity Module (eSIM) has been reserved for the first cellular communication device, wherein the indication comprises an ICCID of the eSIM; and
provide, for transmission to the first cellular communication device, the ICCID.

9. The second cellular communication device of claim 8, wherein the one or more processors are configured to execute the software instructions to:
relay, from the first cellular communication device to the cellular communication network, a message requesting provision of the eSIM reserved for the first cellular communication device; and relay, from the cellular communication network to the first cellular communication device, the eSIM reserved for the first cellular communication device.

10. The second cellular communication device of claim 8, wherein the one or more processors are configured to execute the software instructions to:
receive from the cellular communication network an indication that the eSIM reserved for the first cellular communication device has been activated.

11. The second cellular communication device of claim 8, wherein the one or more processors are configured to execute the software instructions to:
receive a notification push token from the first cellular communication device; and
provide, for transmission to the cellular communication network, a request to activate push notifications to the first cellular communication device using the received notification push token.

12. The second cellular communication device of claim 8, wherein the one or more processors are configured to execute the software instructions to provide the request to initiate cellular service for the first cellular communication device responsive to reception, from the cellular communication network, of a confirmation that no cellular service subscription for the first cellular communication device is currently associated with a subscription account associated with the second cellular communication device.

13. The second cellular communication device of claim 8, wherein the one or more processors are configured to execute the software instructions to:
perform an authentication procedure with the cellular communication network, the authentication procedure comprising receiving an authentication token from the cellular communication network, the authentication token indicating a trusted relationship with the cellular communication network; and
include the authentication token in the request to initiate cellular service for the first cellular communication device.

14. The second cellular communication device of claim 8, wherein the one or more processors are configured to execute the software instructions to:
receive identification information of a third cellular communication device, wherein the request to initiate cellular service for the first cellular communication device includes the identification information of the third cellular communication device and an instruction to associate the first cellular communication device with a Mobile Station International Subscriber Directory Number (MSISDN) previously associated with the third cellular communication device.

15. A non-transitory computer-readable memory medium having program instructions stored thereon, wherein the program instructions when executed by a processor of a second cellular communication device, cause the second cellular communication device to:
provide, to a cellular communication network, a request to initiate cellular service for a first cellular communication device, the request comprising an indication that the cellular service should support standalone operation for the first cellular communication device;
receive, from the cellular communication network, an indication that an embedded Subscriber Identity Module (eSIM) has been reserved for the first cellular communication device, wherein the indication comprises an ICCID of the eSIM; and provide the ICCID to the first cellular communication device.

16. The non-transitory computer-readable memory medium of claim 15, wherein the program instructions further cause the second cellular communication device to:
 relay, from the first cellular communication device to the cellular communication network, a message requesting provision of the eSIM reserved for the first cellular communication device; and
 relay, from the cellular communication network to the first cellular communication device, the eSIM reserved for the first cellular communication device.

17. The non-transitory computer-readable memory medium of claim 15, wherein the program instructions further cause the second cellular communication device to:
 receive from the cellular communication network an indication that the eSIM reserved for the first cellular communication device has been activated.

18. The non-transitory computer-readable memory medium of claim 15, wherein the program instructions further cause the second cellular communication device to:
 receive a notification push token from the first cellular communication device; and
 provide, to the cellular communication network, a request to activate push notifications to the first cellular communication device using the received notification push token.

19. The non-transitory computer-readable memory medium of claim 15, wherein providing the request to initiate cellular service for the first cellular communication device is responsive to receiving, from the cellular communication network, a confirmation that no cellular service subscription for the first cellular communication device is currently associated with a subscription account associated with the second cellular communication device.

20. The non-transitory computer-readable memory medium of claim 15, wherein the program instructions further cause the second cellular communication device to:
 perform an authentication procedure with the cellular communication network, the authentication procedure comprising receiving an authentication token from the cellular communication network, the authentication token indicating a trusted relationship with the cellular communication network; and
 include the authentication token in the request to initiate cellular service for the first cellular communication device.

* * * * *